United States Patent
Huang et al.

(10) Patent No.: US 11,924,735 B2
(45) Date of Patent: Mar. 5, 2024

(54) FIRST NODE, FOURTH NODE AND METHODS PERFORMED THEREBY FOR HANDLING ACCESS TO A COMMUNICATIONS NETWORK IN A MULTI-HOP DEPLOYMENT

(71) Applicant: Telefonaktiebolaget LM Ericsson (publ), Stockholm (SE)

(72) Inventors: Yezi Huang, Täby (SE); Boris Dortschy, Hägersten (SE); Erik Dahlman, Stockholm (SE); Per-Erik Eriksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 428 days.

(21) Appl. No.: 17/265,236

(22) PCT Filed: Sep. 10, 2019

(86) PCT No.: PCT/SE2019/050852
§ 371 (c)(1),
(2) Date: Feb. 2, 2021

(87) PCT Pub. No.: WO2020/055313
PCT Pub. Date: Mar. 19, 2020

(65) Prior Publication Data
US 2021/0306931 A1    Sep. 30, 2021

Related U.S. Application Data

(60) Provisional application No. 62/730,188, filed on Sep. 12, 2018.

(51) Int. Cl.
*H04W 40/22* (2009.01)
*H04W 24/02* (2009.01)
(Continued)

(52) U.S. Cl.
CPC ........... *H04W 40/22* (2013.01); *H04W 24/02* (2013.01); *H04W 40/12* (2013.01); *H04W 40/28* (2013.01); *H04W 40/34* (2013.01)

(58) Field of Classification Search
None
See application file for complete search history.

(56) References Cited

U.S. PATENT DOCUMENTS 11,570,664 B2 * 1/2023 Keskitalo ............ H04W 36/305
2008/0316968 A1 * 12/2008 Sun .......................... H04L 45/20
370/331

(Continued)

FOREIGN PATENT DOCUMENTS

GB    2447885 A    10/2008

OTHER PUBLICATIONS

PCT International Search Report and Written Opinion dated Nov. 29, 2019 for International Application No. PCT/SE2019/050852, 11 pages.

(Continued)

*Primary Examiner* — Brian S Roberts
(74) *Attorney, Agent, or Firm* — Sage Patent Group

(57) ABSTRACT

A method, performed by a first node (111). The method is for handling access to a communications network (100) in a multi-hop deployment. The first node receives (305), from a fourth node (114), information. The information indicates a recommendation on which node within radio range to connect to, out of a plurality of candidate parent nodes (120). The plurality comprises a first set (121) and a second set (122) of candidate parent nodes. A third node (113) is enabled to be a donor node in the first set (121). A sixth node (116) is enabled to be a donor node in the second set (122). The first node also determines (307), out of the plurality, a second node (112) to establish a connection with. The (Continued)

determining (307) is based on the received information. The first node then initiates (308) establishment of a connection or re-connection to the network via the second node (112), as first-hop.

19 Claims, 13 Drawing Sheets

(51) Int. Cl.
*H04W 40/12* (2009.01)
*H04W 40/28* (2009.01)
*H04W 40/34* (2009.01)

(56) References Cited

U.S. PATENT DOCUMENTS

| | | | | |
|---|---|---|---|---|
| 2018/0091416 A1* | 3/2018 | Ghosh | ................... | H04L 45/123 |
| 2019/0327660 A1* | 10/2019 | Hong | .................... | H04W 40/38 |
| 2020/0045563 A1* | 2/2020 | Luo | ....................... | H04W 52/42 |

OTHER PUBLICATIONS

Samsung, 3GPP TSG-RAN WG2 #103, R2-1811998, "IAB Topology and Route Management", Gothenburg, Sweden, Aug. 20-24, 2018, 3 pages.
Ericsson, 3GPP TSG-RAN WG1 Meeting #94, R1-1809232, "More Details on IAB Evaluation Methodology", Gothenburg, Sweden, Aug. 20-24, 2018, 7 pages.
Huawei, 3GPP TSG-RAN WG3 #101, R3-184805, "Basic Principles for IAB Topology Adaptation", Gothenburg, Sweden, Aug. 20-24, 2018, 4 pages.
ZTE, 3GPP TSG-RAN WG2 Meeting #102, R2-1807401, "Discussion on IAB Node Access Procedure", Busan, Korea, May 21-25, 2018, 5 pages.
Nokia et al., 3GPP TSG-RAN WG2 Meeting #103, R2-1812341, "Topology Adaptation Scenarios", FS_NR_IAB—Release 16, Gothenburg, Sweden, Aug. 20-24, 2018, 6 pages.
Ericsson, 3GPP TSG-RAN WG1 Meeting #94, R1-1811514, "Evaluation of Topology Formation for IAB", Chengdu, China, Oct. 8-12, 2018, 8 pages.

* cited by examiner a)

b)

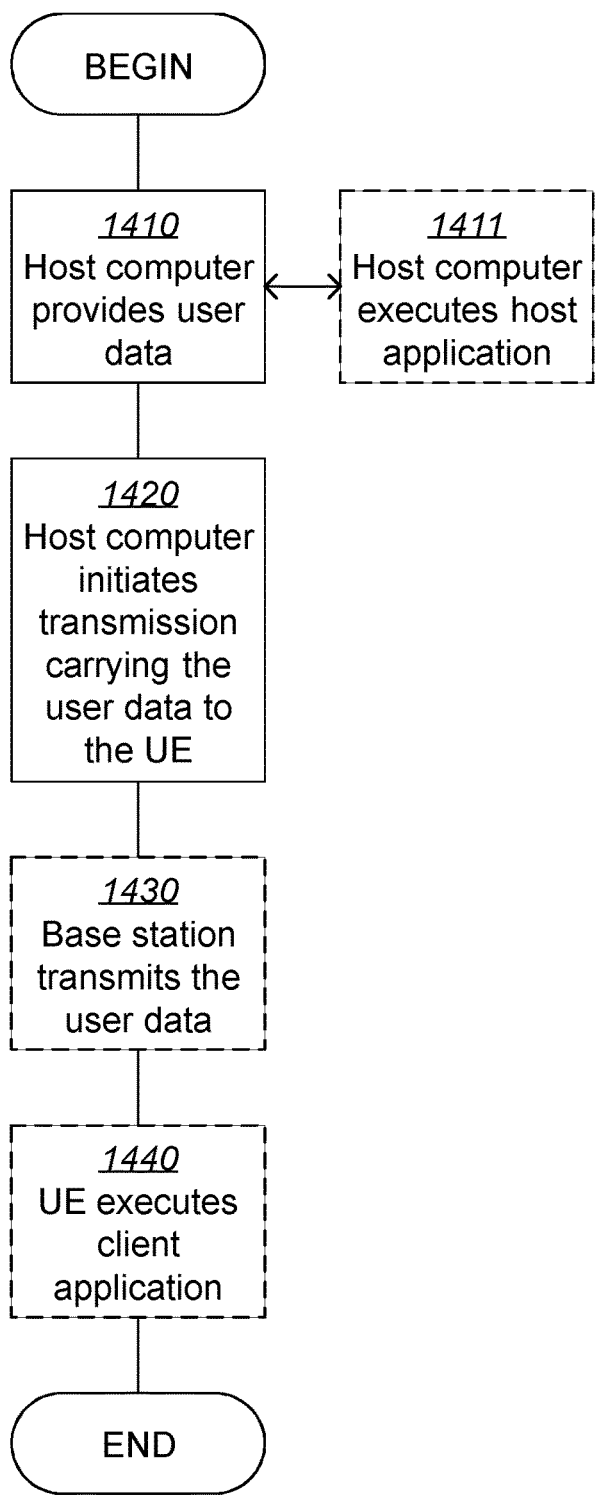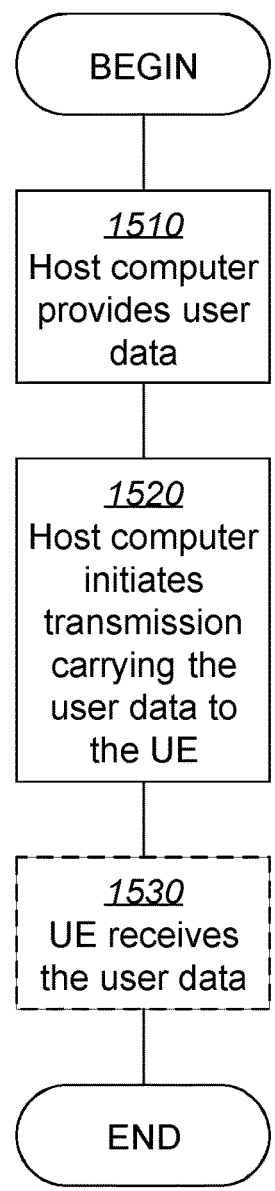
FIG. 14
FIG. 15

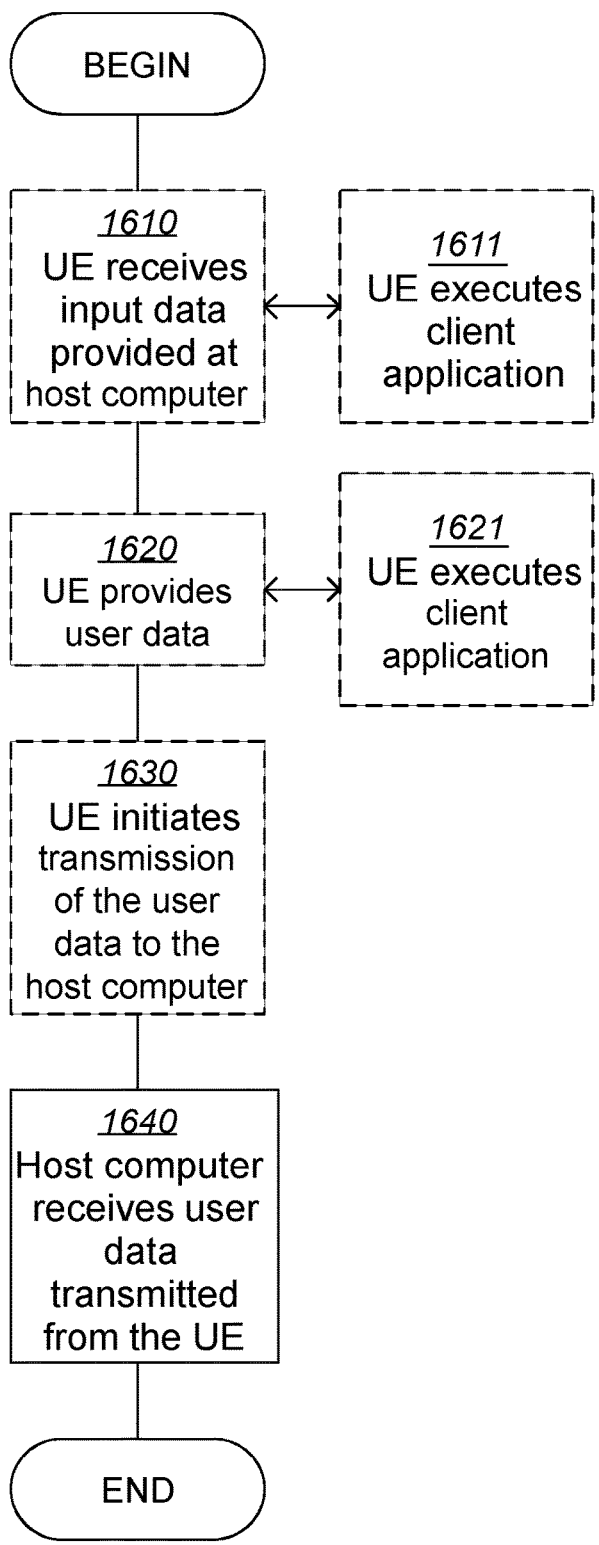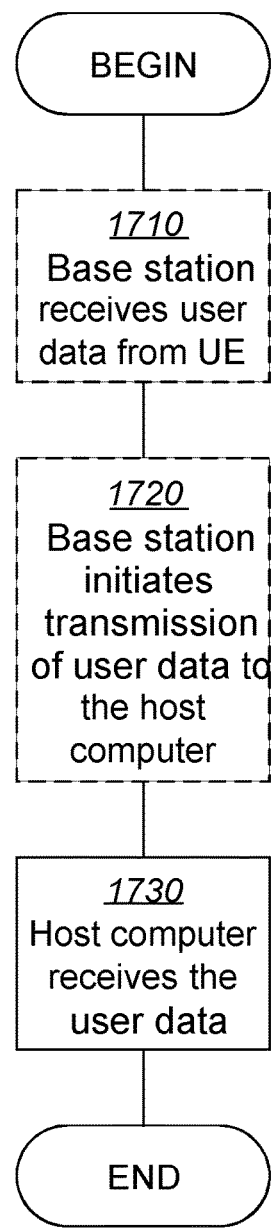
FIG. 16
FIG. 17

FIRST NODE, FOURTH NODE AND METHODS PERFORMED THEREBY FOR HANDLING ACCESS TO A COMMUNICATIONS NETWORK IN A MULTI-HOP DEPLOYMENT

CROSS-REFERENCE TO RELATED APPLICATIONS

This application is a 35 U.S.C. § 371 national stage application for International Application No. PCT/SE2019/050852, entitled "FIRST NODE, FOURTH NODE AND METHODS PERFORMED THEREBY FOR HANDLING ACCESS TO A COMMUNICATIONS NETWORK IN A MULTI-HOP DEPLOYMENT", filed on Sep. 10, 2019, the disclosures and contents of which are hereby incorporated by reference in their entireties. Further, the present application claims the benefit of and priority to U.S. Provisional Patent Application No. 62/730,188, filed Sep. 12, 2018, entitled "FIRST NODE, FOURTH NODE AND METHODS PERFORMED THEREBY FOR HANDLING ACCESS TO A COMMUNICATIONS NETWORK," the disclosure of which is hereby incorporated herein by reference in its entirety

TECHNICAL FIELD

The present disclosure relates generally to a first node, and methods performed thereby, for handling access of a first node to a communications network in a multi-hop deployment. The present disclosure additionally relates generally to a fourth node, and methods performed thereby, for handling access of the first node to the communications network in the multi-hop deployment.

BACKGROUND

Nodes within a communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Nodes may also be network nodes, such as radio network nodes, e.g., Transmission Points (TP). The communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The so-called 5G system, from a radio perspective started to be standardized in 3GPP, and the so-called New Radio (NR) is the name for the radio interface. NR architecture is being discussed in 3GPP. In the current concept, gNB denotes NR BS, where one NR BS may correspond to one or more transmission/reception points. The expression Uplink (UL) may be used for the transmission path in the opposite direction i.e., from the wireless device to the base station.

In a multi-hop wireless relay network, some UEs may connect to the network via relay nodes over more than one hop. In FIG. 1, a multi-hop integrated access and backhaul (IAB) deployment is presented, where the IAB donor node, in short IAB donor, may be understood to have a wired connection to the core network and the IAB relay nodes, in short IAB nodes, may be understood to be wirelessly connected to the IAB donor, either directly, understood as a single hop, or indirectly via other IAB nodes, understood as a multi-hop. The connection between IAB donor/node and UEs may be referred to as access link, whereas the connection between two IAB nodes or between an IAB donor and an IAB node may be referred to as backhaul link. For the IAB network, the backhaul links may be realized as NR wireless links. The IAB donor and some of the IAB nodes may serve not only the UE traffic within the serving range over the access link, but also the aggregated traffic from/to the child nodes over the backhaul link.

When an IAB node is turned on, its parent node, that is, what node—a donor node in case of single hop or another already connected IAB node in case of multi-hop- to eventually connect to, may need to be decided on. For example, in the case of FIG. 1, the IAB node 2 (IAB-N2) may either connect to IAB-N1, or directly to the IAB donor (IAB-DN). The connection determination of each IAB node may form a certain topology between the IAB donor and IAB nodes that may impact on the achievable performance of the UEs.

For different reasons, an already connected IAB node may also, potentially, have to change its connection to a different parent node.

Within the 3GPP Study Item IAB, the related topic of Topology Management is discussed, but no procedure is agreed on and proposals are on high level, such as [1]:

Topology discovery may incorporate the following procedures:

1) An IAB node, in the Mobile Termination (MT) mode, first finds the best serving node, following the same procedures as a normal UE.
2) Once the node establishes the Radio Resource Control (RRC) connection, RRC messages are exchanged with donor IAB node, performing topology discovery and route selection functions.

3) Before switching into the full-functional IAB mode, the child IAB node may be moved to a different serving IAB node if so decided by NW, following the legacy handover procedures.

Another related proposal for IAB topology adaptation is in [2], in the Discussion section: "IAB donor or upstream IAB node broadcasts some assistance information such as hop information and/or load information for initial cell selection. One reason is that selecting an upstream node (the donor node or the IAB node) with fewer hops from the donor node is beneficial for delay sensitive services. However, this is not really necessary since the donor node can redirect or handover the IAB node to another upstream node after initial access to meet specific requirements. In L2 relaying, the RRC layer is located in donor node, and the donor node has full information such as measurement results from the IAB node, each link load/interference information, etc. It could be best to let the donor to decide on topology updates, rather than rely on IAB node logic with limited information about network topology and loading." . . .

After the initial access, the MT of the accessed IAB node may also perform measurements for link quality or to discover other upstream IAB nodes. And it may also be possible that each IAB node may be configured to provide information about node status such as the traffic load. After receiving measurement results and the above-mentioned information from multiple IAB nodes, the donor node may be aware of the topology related information, such as link quality, traffic load and neighbours of each IAB node, for the whole network. Thus the donor node may select a more suitable upstream node for any IAB node, and handover/redirect this IAB node to the selected upstream node for specific purposes, such as to perform load balancing or to guarantee a better link quality . . . .

Also, an IAB node may be configured to perform measurement of other IAB donors and report measurement results to its serving IAB donor node. In the meantime, the serving IAB donor may cooperate with other IAB donors to collect information about the status of those downstream IAB nodes. With this collected topology information, the serving IAB donor node may also decide to perform a traditional inter-node handover/redirection procedure to handover the IAB node to another IAB donor node.

Existing methods for establishing connections in a multi-hop integrated access and backhaul (IAB) deployment may lead to waste of radio resources, increased latency, waste of processing resources, and waste of energy resources.

SUMMARY

It is an object of embodiments herein to improve the handling of access of a first node to a communications network in a multi-hop deployment.

According to a first aspect of embodiments herein, the object is achieved by a method performed by a first node. The method is for handling access of the first node to a communications network in a multi-hop deployment. The first node receives, from a fourth node, information. The information indicates a recommendation on which node within radio range to connect to, out of a plurality of candidate parent nodes. The plurality of candidate parent nodes comprises a first set of candidate parent nodes and a second set of candidate parent nodes. A third node is enabled to be a donor node to the first node in the first set. A sixth node is enabled to be a donor node to the first node in the second set. The first node also determines, out of the plurality of candidate parent nodes, a second node to establish a connection with. The determining is based on the received information. The first node also initiates establishment of a connection or re-connection to the communications network via the determined second node, as first-hop node.

According to a second aspect of embodiments herein, the object is achieved by a method performed by the fourth node. The method is for handling access of the first node to the communications network in the multi-hop deployment. The fourth node operates in the communications network. The fourth node determines, for the first node, which node within radio range of the first node to connect to, out of the plurality of candidate parent nodes. The plurality of candidate parent nodes comprises the first set of candidate parent nodes and/or the second set of candidate parent nodes. The third node is enabled to be the donor node to the first node in the first set. The sixth node is enabled to be the donor node to the first node in the second set. The fourth node also indicates, to the first node, the information indicating the recommendation on which determined node within radio range to connect to.

According to a third aspect of embodiments herein, the object is achieved by the first node. The first node may be considered to be for handling the access of the first node to the communications network in the multi-hop deployment. The first node is configured to receive, from the fourth node, the information. The information is configured to indicate the recommendation on which node within radio range to connect to, out of the plurality of candidate parent nodes. The plurality of candidate parent nodes are configured to comprise the first set of candidate parent nodes and the second set of candidate parent nodes. The third node is configured to be enabled to be the donor node to the first node in the first set. The sixth node is configured to be enabled to be the donor node to the first node in the second set. The first node is also configured to determine, out of the plurality of candidate parent nodes, the second node to establish the connection with. To determine is configured to be based on the received information. The first node is further configured to initiate the establishment of the connection or the re-connection to the communications network via the determined second node, as first-hop node.

According to a fourth aspect of embodiments herein, the object is achieved by the fourth node. The fourth node may be considered to be for handling the access of the first node to the communications network in the multi-hop deployment. The fourth node is configured to operate in the communications network. The fourth node is further configured to determine, for the first node, which node within radio range of the first node to connect to, out of the plurality of candidate parent nodes. The plurality of candidate parent nodes is configured to comprise the first set of candidate parent nodes and/or the second set of candidate parent nodes. The third node is configured to be enabled to be a donor node to the first node in the first set. The sixth node is configured to be enabled to be a donor node to the first node in the second set. The fourth node is also configured to indicate, to the first node, the information configured to indicate the recommendation on which determined node within radio range to connect to.

By the first node receiving the information indicating the recommendation, the first node may obtain feedback from the fourth node, a network with the topology-management function, which may be understood to have a better overview of the plurality of candidate parent nodes, on a connection recommendation using more advanced metrics considering, e.g., end-to-end performance and the impact on the potential on-path parent node(s) along the multi-hop topology, other than barely based on the per-link quality. Therefore, the first node may determine the parent node to establish a connection with while optimizing the performance of the communications network, thereby decreasing latency and preventing waste of resources.

BRIEF DESCRIPTION OF THE DRAWINGS

Examples of embodiments herein are described in more detail with reference to the accompanying drawings, and according to the following description.

FIG. 14 is a flowchart depicting embodiments of a method in a communications system including a host computer, a base station and a user equipment, according to embodiments herein.

FIG. 15 is a flowchart depicting embodiments of a method in a communications system including a host computer, a base station and a user equipment, according to embodiments herein.

FIG. 16 is a flowchart depicting embodiments of a method in a communications system including a host computer, a base station and a user equipment, according to embodiments herein.

FIG. 17 is a flowchart depicting embodiments of a method in a communications system including a host computer, a base station and a user equipment, according to embodiments herein.

DETAILED DESCRIPTION

As part of the development of embodiments herein, one or more challenges with the existing technology will first be identified and discussed.

In a relay network limited to single hop links, that is, only one IAB node on the path from the donor to the device, with even geographical distribution of UEs, the decision of parent node may be done like the decision of serving node for UEs, that is, by measuring and comparing the link quality to the candidate parent nodes and choosing the best link to connect to.

Figure 1:
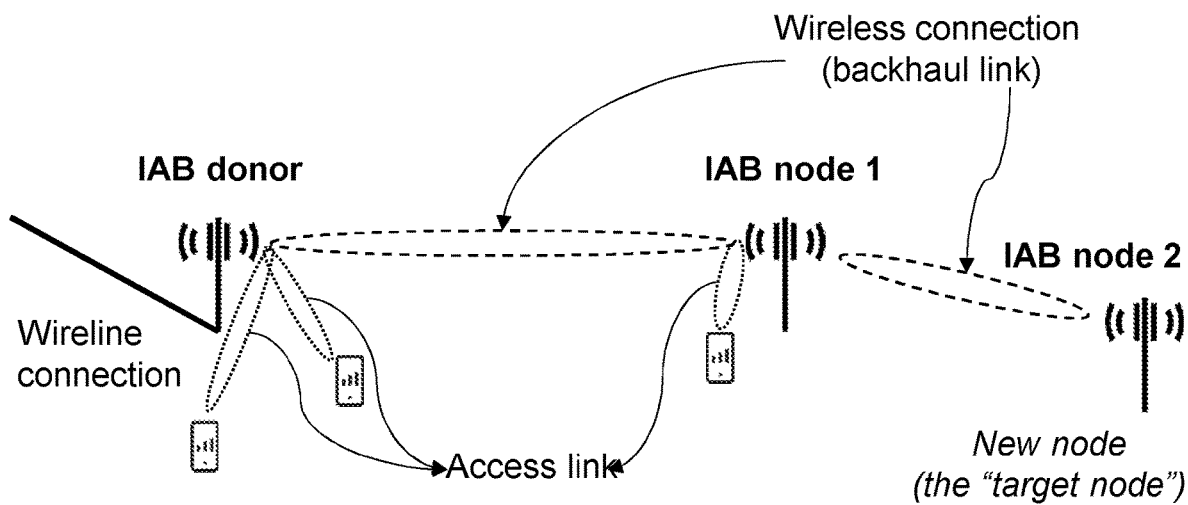
FIG. 1 is a schematic diagram illustrating a multi-hop deployment in an integrated access and backhaul (IAB) network, according to existing methods.

However, a link quality measurement may not be sufficient, or at least not fully efficient, to decide on parent node when multi-hop is allowed. In the case of FIG. 1, for example, assume that the link quality between IAB-N1 and IAB-N2 is much better than that between IAB-DN and IAB-N2. If the connection determination is only based on per-link quality, IAB-N2 will connect to IAB-N1, i.e., connect to the donor by two hops. But due to the impact of the link between IAB-DN and IAB-N1, the end-to-end performance of the UEs served by IAB-N2 may become worse than if IAB-N2 directly connects to the IAB-DN. Therefore, the end-to-end effect of multi-hop connection may need to be considered when determining the serving or parent node for the target IAB/relay node.

In addition, if IAB-N2 is connected to IAB-N1, all the traffic to/from IAB-N2 will share the resources of IAB-N1, which would otherwise be devoted exclusively to the UEs already served by IAB-N1. The impact of a connecting IAB/relay node on all the upstream parent nodes may need to ideally also be considered when determining, if a connection should be in a multi-hop manner or not.

In [1], a new IAB-node initially connects to an IAB network as a normal UE; the IAB donor node, or the corresponding Central Unit (CU) in case of F1-split node architecture, in the IAB network the new node is connected to performs topology discovery and provides routing information to the new IAB node. However, the described joining procedure does not mention any second IAB-donor node that is potentially involved in finding an optimized overall IAB topology, which could be the case, if a new IAB-node could connect to two different IAB-chains that are attached to two different IAB-donor nodes. The procedure in [1] assumes a single central topology control by the IAB-donor node that the new IAB-node will attach to. However, a method with a distributed decision taking, for example across donor nodes or by the joining IAB-nodes themselves, is not described or mentioned. Also, it is not described what information the new IAB node may or will at all provide to the donor, or corresponding CU, in order to improve topology management. It is only described that the new IAB node connects to one (1) serving node, described as the "best" serving node; so, the information that the new IAB node may provide is limited to that connection.

In [2], only methods are described when decisions are taken by functions in the donor node(s). This may be one example of a "Centralized topology-management function". However, a distributed topology-management function when logic lies in a joining IAB node, and not in a donor node, is not described. This limitation is expressed in [2] as "rather than rely on IAB node logic" as well as "donor node can redirect or handover the IAB node to another upstream node after initial access to meet specific requirements". The described steps in the method in [2] always assume that the donor node takes the decision and the joining IAB node eventually follows instructions, to handover. In case several donor nodes should ideally be included in the decision process, the coordination across two or more donor nodes may be of significant addition 5G RAN and 5G Core complexity. Another drawback of the methodology described in [2] is that a more network wise cooperation, across donors, as well as addition measurements ("to discover other upstream IAB nodes", "of other IAB donors") in order to find the best parent node to attach by the joining node is only performed after the joining has already been attached, whereas a less complex way may be the joining node acting autonomously for all network information gathering actions, and being the coordination point itself.

Certain aspects of the present disclosure and their embodiments may provide solutions to these challenges or other challenges. There are, proposed herein, various embodiments which address one or more of the issues disclosed herein.

As a brief overview, embodiments herein may be understood to relate to a method of finding a parent node for a multi-hop relay.

In the new generation wireless backhauling networks, e.g., the integrated access and backhaul (IAB) network, multi-hop deployment is envisioned. Embodiments herein may be understood to provide a method for an IAB/relay node for the initial access process as well as a process during a possible reconnection to an IAB network to determine the serving parent node when multi-hop deployment may be allowed or desired. When the target node, e.g., the new node for initial access or a node searching for reconnection, to be connected turns on, it may, iteratively, exchange with the network about the link-quality information towards all candidate serving nodes/donors via temporarily connecting to one of the candidate serving nodes/donors. The network with the topology-management function(s) may feedback with information on connection recommendation using more advanced metrics considering end-to-end performance and the impact on the potential on-path parent node(s) other than barely based on the per-link quality. If more than one topology-management function, which may make the connection recommendation, need to be involved, the target node may disconnect from the previously temporary parent node and reconnect to another temporary parent node for further information exchange. The process may be repeated until all candidate serving nodes/donors may have been evaluated. Based on the overall feedback from the network, the target node may then determine or follow the recommendation about which node/donor to connect to.

In general, embodiments herein may therefore be understood to be related to 5G NR, integrated access and backhaul, initial access, multi-hop relay, topology formation, parent node, and/or cell search.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 2:
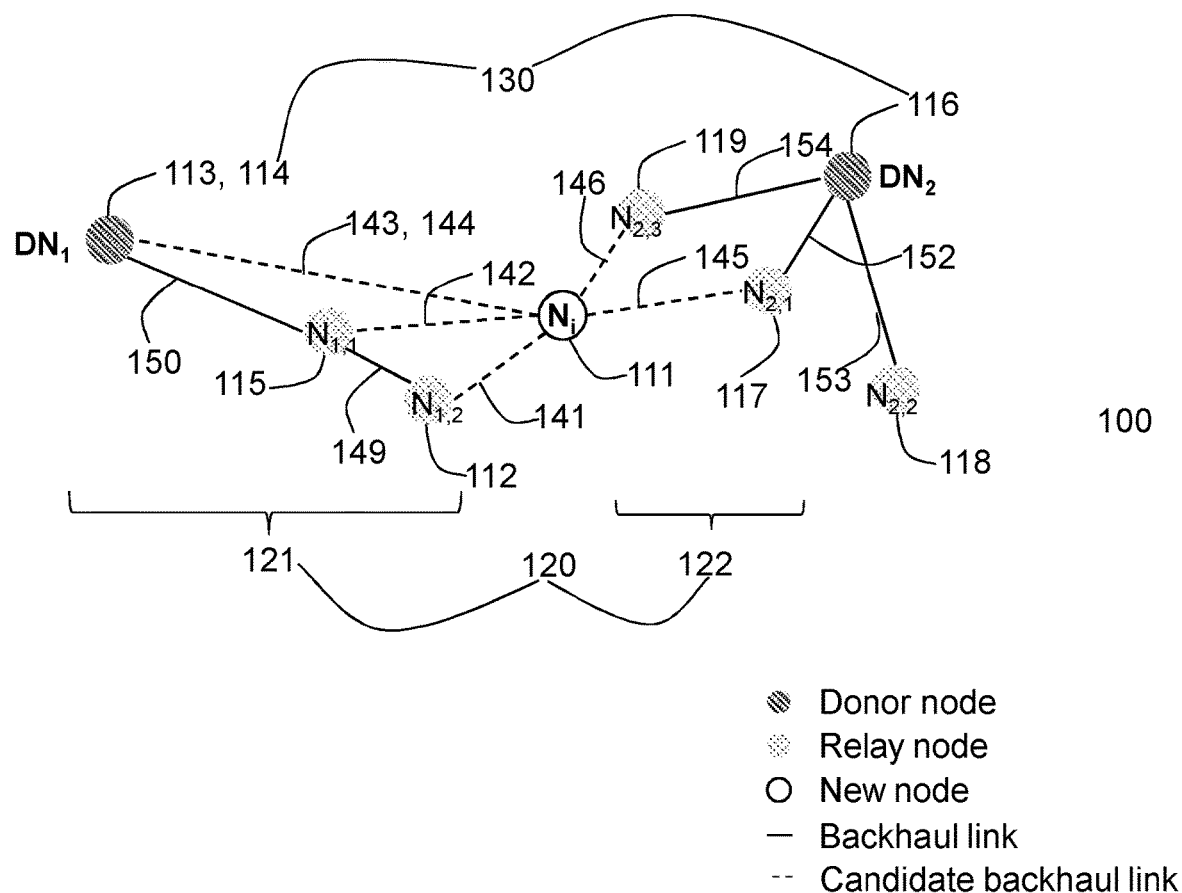
FIG. 2 is a schematic diagram illustrating a communications network, according to embodiments herein.

FIG. 2 depicts a non-limiting example of a communications network 100, which may be a wireless communications network, sometimes also referred to as a wireless communications system, cellular radio system, or cellular network, in which embodiments herein may be implemented. The communications network 100 may typically be a 5G system, 5G network, NR-U or Next Gen System or network, LAA, or MulteFire. The communications network 100 may alternatively be a younger system than a 5G system The communications network 100 may support other technologies such as, particularly, Long-Term Evolution (LTE) system, LTE-Advanced/LTE-Advanced Pro, e.g., LTE Frequency Division Duplex (FDD), LTE Time Division Duplex (TDD), LTE Half-Duplex Frequency Division Duplex (HD-FDD), and LTE operating in an unlicensed band. The communications network 100 may support yet other technologies such as, for example, License-Assisted Access (LAA), Narrow Band Internet of Things (NB-IoT), Machine Type Communication (MTC), MulteFire, Wideband Code Division Multiplexing Access (WCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising of any combination of Radio Access Technologies (RATs) such as e.g., Multi-Standard Radio (MSR) base stations, multi-RAT base stations etc., any 3rd Generation Partnership Project (3GPP) cellular network, WiFi networks, Worldwide Interoperability for Microwave Access (WiMax). Thus, although terminology from 5G/NR and LTE may be used in this disclosure to exemplify embodiments herein, this should not be seen as limiting the scope of the embodiments herein to only the aforementioned systems.

The communications network 100 comprises a plurality of nodes, whereof a first node 111, a second node 112, a third node 113, a fourth node 114, a fifth node 115, and a sixth node 116 are depicted in the non-limiting example of FIG. 2. The non-limiting example of FIG. 2, for illustrative purposes, further depicts a seventh node 117, an eighth node 118 and a ninth node 119. Any of the first node 111, the second node 112, the third node 113, the fourth node 114, the fifth node 115, the sixth node 116, the seventh node 117, the eighth node 118 and the ninth node 119 may be a radio network node, such as a radio base station, base station or a transmission point, or any other network node with similar features capable of serving a user equipment, such as a wireless device or a machine type communication device, in the communications network 100. For example, any of the first node 111, the second node 112, the third node 113, the fourth node 114, the fifth node 115, the sixth node 116, the seventh node 117, the eighth node 118 and the ninth node 119 may be a gNB, an eNB, an eNodeB, or an Home Node B, an Home eNode B. Any of the first node 111, the second node 112, the third node 113, the fourth node 114, the fifth node 115, the sixth node 116, the seventh node 117, the eighth node 118 and the ninth node 119 may be of different classes, such as, e.g., macro base station (BS), home BS or pico BS, based on transmission power and thereby also cell size. In some embodiments, any of the first node 111, the second node 112, the third node 113, the fourth node 114, the fifth node 115, the sixth node 116, the seventh node 117, the eighth node 118 and the ninth node 119 may be implemented as one or more distributed nodes, such as virtual nodes in the cloud, and they may perform their functions entirely on the cloud, or partially, in collaboration with one or more radio network nodes.

As depicted in the non-limiting example of FIG. 2, the communications network 100 comprises a multi-hop deployment, wherein the first node 111 may be considered a new node, or a target node. Each of the third node 113 and the sixth node 116 may be understood as being enabled to be a donor node. Each of the second node 112, the fifth node 115, the seventh node 117, the eighth node 118 and the ninth node 119 may be understood as a relay node or an IAB node, which may be a stationary relay/IAB node or a mobile relay/IAB node. Each of the fourth node 114 and the sixth node 116, in the non-limiting example of FIG. 2, may be understood as having a capability to perform a topology management function. The communications network 100 may comprise a plurality of candidate parent nodes 120. In some examples, the plurality of candidate parent nodes 120 may comprise the second node 112, the third node 113, and the fifth node 115. In the non-limiting example of FIG. 2, the plurality of candidate parent nodes 120 may comprise the second node 112, the third node 113, the fifth node 115, the seventh node 117 and the ninth node 119. The plurality of candidate parent nodes 120 may comprise a first set 121 and a second set 122. In the non-limiting example of FIG. 2, the first set 121 may comprise the second node 122, the third node 113, and the fifth node 115, and the second set 122 may comprise the seventh node 117 and the ninth node 119. The plurality of candidate parent nodes 120 may comprise one or more upstream serving, or parent, nodes, such as the fifth node 115.

The communications network 100 may comprise a plurality of fourth nodes 130. The plurality of fourth nodes 130 may comprise the fourth node 114 and other fourth nodes, such as, e.g., the sixth node 116. In the non-limiting example of FIG. 2, the plurality of fourth nodes 130 comprises the fourth node 114 and the sixth node 116. The nodes in the plurality of fourth nodes 130 may therefore be understood as having the capability to perform a topology management function.

While in some examples, any of the fourth node 114 and the sixth node 116 may be independent nodes, in other examples, any of the fourth node 114, and the sixth node 116 may be co-localized, or be part of the same network node. In the particular non-limiting example of FIG. 2, the third node 113 is co-localized with the fourth node 114. However, in other examples, the fourth node 114 may be an independent node, e.g., not a donor node. Similarly, another fourth node, similar to, e.g., the sixth node 116, may, in other examples not depicted in FIG. 2, be another independent node, e.g., not a donor node.

The communications network 100 covers a geographical area which may be divided into cell areas, wherein each cell area may be served by a node, although, one node may serve one or several cells. In the non-limiting example of FIG. 2, the cells are not depicted to simplify the Figure. Any of the third node 113 and the sixth node 116 may be directly connected to one or more core networks, which are not depicted in FIG. 2 to simplify the Figure.

A wireless device, or more, may be located in the wireless communication network 100, which are not depicted in the non-limiting example of FIG. 2. The wireless device, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The wireless device may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device comprised in the communications network 100 is enabled to communicate wirelessly in the communications network 100. The communication may be performed e.g., via a RAN, and possibly the one or more core networks, which may be comprised within the communications network 100.

The first node 111 may be configured to communicate in the communications network 100 with the second node 112 over a first link 141, with the fifth node 115 over a second link 142, with the third node 113 over a third link 143, and with the fourth node 114 over a fourth link 144 each of which links may be, e.g., a radio link. Note that in the non-limiting example of FIG. 2, the third link 143 is the same as the fourth link 144. The first node 111 may be configured to communicate in the communications network 100 with the seventh node 117 over a fifth link 145, with the ninth node 119 over a sixth link 146, with the eighth node 118 over a seventh link, which is not depicted in the Figure, and with the sixth node 116 over an eighth link, which is not either depicted in the Figure. Each of the fifth link 145, the sixth link 146, the seventh link and the eighth link may be, e.g., a radio link. The second node 112 may be configured to communicate in the communications network 100 with the fifth node 115 over a ninth link 149, e.g., a radio link. The fifth node 115 may be configured to communicate in the communications network 100 with the third node 113 over a tenth link 150, e.g., a radio link. In examples wherein the third node 113 and the fourth node 114 are not the same node, the third node 113 may be configured to communicate in the communications network 100 with the fourth node 114 over an eleventh link, e.g., a radio link or a wired link, which is not depicted in the Figure. The seventh node 117 may be configured to communicate in the communications network 100 with the sixth node 116 over a twelfth link 152, e.g., a radio link. The eighth node 118 may be configured to communicate in the communications network 100 with the sixth node 116 over a thirteenth link 153, e.g., a radio link. The ninth node 119 may be configured to communicate in the communications network 100 with the sixth node 116 over a fourteenth link 154, e.g., a radio link.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", "fifth", . . . , "fourteenth", etc. herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first node, such as the first node 111, e.g., a first gNB, and embodiments related to a fourth node, such as the fourth node 114, e.g., a second gNB.

Figure 3:
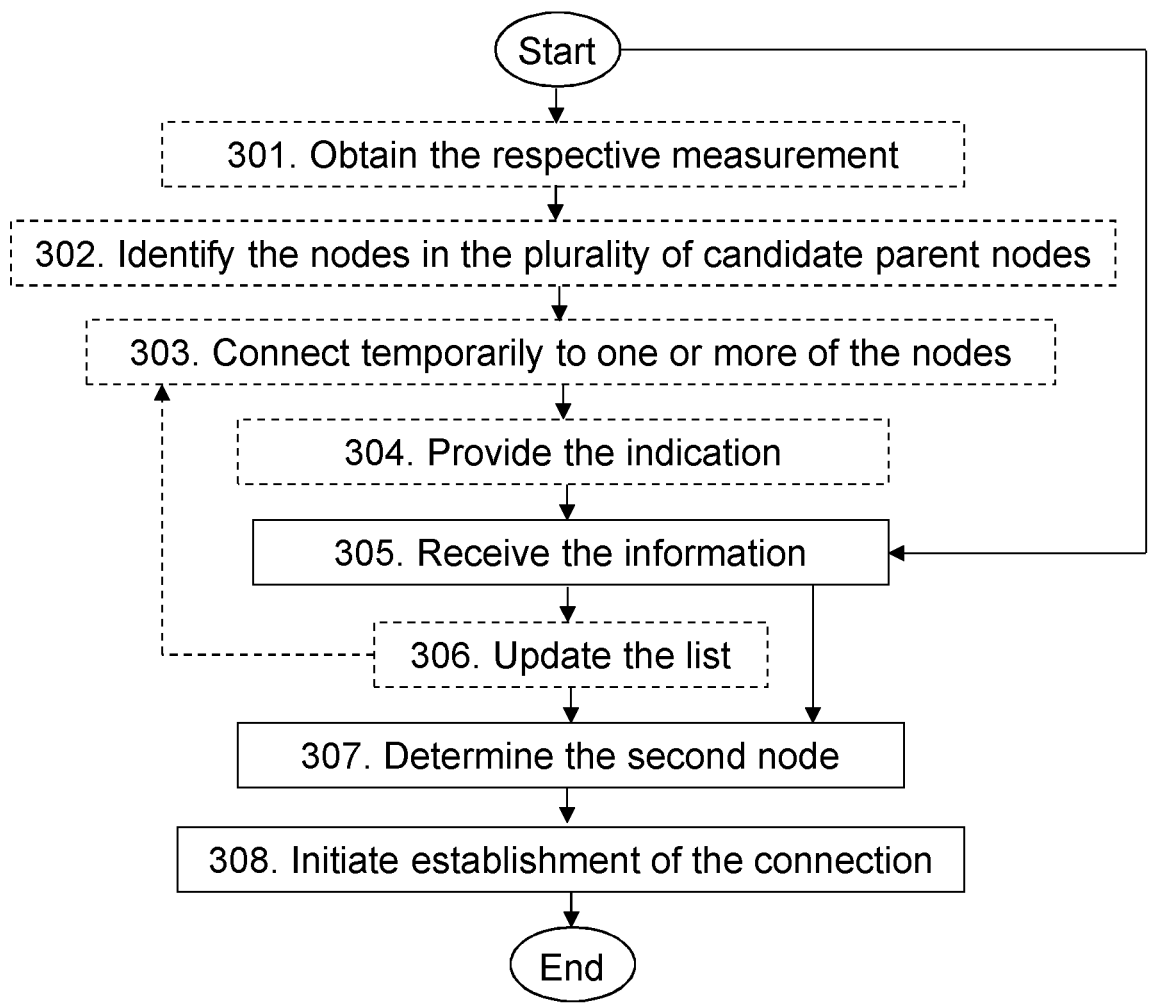
FIG. 3 depicts a flowchart of a method in a first node, according to embodiments herein.

Embodiments of a method, performed by the first node 111, which may also be known as a target node, will now be described with reference to the flowchart depicted in FIG. 3. The method may be understood to be for handling access of the first node 111 to the communications network 100 in a multi-hop deployment. The first node 111 may be understood to operate in the wireless communications network 100.

Several embodiments are comprised herein. In some embodiments all the actions may be performed. In some embodiments, some actions may be performed. One or more embodiments may be combined, where applicable. All possible combinations are not described to simplify the description. Some actions may be performed in a different order than that shown in FIG. 3. In FIG. 3, actions which may be optional in some examples are depicted with dashed boxes. In some examples, Actions 301-304 may be performed. In other examples, such as that depicted in FIG. 3, Actions 305 and 307-308 are performed. In some examples, Actions 301-306 may be performed, wherein Actions 303-306 are performed iteratively, as described below, e.g., in a series of cell-search iterations.

It should be noted that the examples herein are not mutually exclusive. Components from one embodiment may be tacitly assumed to be present in another embodiment and it will be obvious to a person skilled in the art how those components may be used in the other exemplary embodiments.

Action 301

In the course of operations in the wireless communications network 100, the first node 111 may be within radio range of the plurality of candidate parent nodes 120. The plurality of candidate parent nodes 120, as described earlier, comprises a first set 121 of candidate parent nodes and a second set 122 of candidate parent nodes. The third node 113 is enabled to be a donor node to the first node 111 in the first set 121, and the sixth node 116 is enabled to be a donor node to the first node 111 in the second set 122.

That the third node 113 is enabled to be a donor node to the first node 111 in the first set 121 may be understood to mean that the first node 111 may be enabled to access a backhaul connection, e.g., a wireline connection, of the third node 113 to the communications network 100 via, respectively, each candidate parent node in the first set 121 of the plurality of candidate parent nodes 120. The third node 113 may also be known as donor node or end node.

That the sixth node 116 is enabled to be a donor node to the first node 111 in the second set 122 may be understood to mean that the first node 111 may be enabled to access a backhaul connection, e.g., a wireline connection, of the sixth node 116 to the communications network 100 via, respectively, each candidate parent node in the second set 122 of the plurality of candidate parent nodes 120. The sixth node 116 may also be known as other donor node or other end node.

In this Action 301, the first node 111 may obtain a respective measurement of a quality of a respective link between the first node 111 and each of the nodes in the plurality of candidate parent nodes 120, in the first set 121, and/or in the second set 122.

Obtaining a measurement may be understood as e.g., measuring. Obtaining may be performed, e.g., via the first link 141, the second link 142, the third link 143, the fifth link 145, and/or the sixth link 146.

The quality may be e.g., Reference signal received power (RSRP), e.g., Synchronization signal (SS)/Physical broadcast channel (PBCH) block (SSB) RSRP, Reference signal received quality (RSRQ), Signal to Interference plus Noise Ratio (SINR), etc.

This Action 301 may be performed by the Mobile Termination (MT) function of the first node 111. According to this Action 301, the MT function of the target IAB node ("N" _i in FIG. 2) may search for, and measure the link performance of, candidate parent nodes already connected to the IAB network.

FIG. 2 may be understood to provide a non-limiting example of a multi-hop node connection. As denoted in FIG. 2, when the first node 111, that is, the target node, i.e., node $N_i$, may turn on, its MT function may measure the link quality from all candidate parent nodes like a user equipment (UE) by using, for example, Synchronization signal (SS)/Physical broadcast channel (PBCH) block (SSB) Reference signal received power (RSRP). Unlike a UE, which may typically connect to the cell providing the highest RSRP, the target node may follow an additional cell searching process before eventually connecting to a certain and final parent node. Embodiments herein may be understood to provide the process to achieve an optimized/balanced node connection in a multi-hop topology.

Action 302

In this Action 302, the first node 111 may identify the nodes in the plurality of candidate parent nodes 120, based on the respective measurement of the respective link between the first node 111 and each respective candidate parent node in the plurality of candidate parent nodes 120 exceeding a threshold.

To identify may be understood as obtaining an identity, and may comprise, e.g., obtaining the physical cell ID (PCID) by decoding the primary synchronization signal (PSS) and secondary synchronization signal (SSS) in SSB.

The identifying 302 may be based on the respective measurement of the respective link between the first node 111 and each respective candidate parent node in the plurality of candidate parent nodes 120, in the first set 121, and/or in the second set 122, exceeding the threshold.

The threshold may be a value. For example, the threshold may be e.g., any value that any wireless device, e.g., a UE, may have/decide when it may or may not, e.g., because radio coverage is bad, connect to a RAN.

In may be understood that initially, a measurement may be performed between the first node 111 and any other measurable node within radio range. A subset of these nodes will be the plurality of candidate parent nodes 120 comprising the first set 121, and/or the second set 122. The subset of nodes in the plurality of candidate parent nodes 120, out of all measurable nodes, may be understood to be determined by the node's respective measure above the threshold. This may be understood to mean that for example, after measuring several links from different donor nodes, or already connected IAB nodes, generally called nodes hereinafter, all the nodes that provide RSRP, or other metrics, higher than a predefined threshold may be viewed as candidate parent nodes to the first node 111, or target node $N_i$. In the example of FIG. 2, $DN_1$, $N_{1,2}$, $N_{1,1}$, $N_{2,1}$ and $N_{2,3}$ are the candidate parent nodes of node $N_i$.

The first node 111, node $N_i$, may then record the measurement to the candidate parent nodes and decode the identification of the candidate parent nodes. For the future IAB node/donor, additional information may be provided by the candidate parent node, such as the associated donor ID of each IAB node.

Action 303

In order for the first node 111 to determine, out of the plurality of candidate parent nodes 120, which node to establish a connection with the first node 111 may, during the cell searching process, exchange topology-related information with one and/or multiple topology-management network function(s), such as the fourth node 114 and/or the sixth node 116, over one or more temporary connection(s).

In this Action 303, the first node 111 may connect, temporarily, to one or some of the nodes in the plurality of candidate parent nodes 120, such as e.g., the second node 112. This Action 303 may be performed by the MT function of the first node 111.

To be able to exchange information with the first topology-management function, which for example may be located in $DN_1$, the first node 111 may temporarily connect to the node that may provide, e.g., the highest measurement of the quality, e.g., the highest RSRP, or another metric. This node may be referred to herein as the temporary parent node, e.g., $N_{1,2}$.

In some of such embodiments, wherein the plurality of candidate parent nodes 120 may comprise two or more sets of candidate parent nodes such as the first set 121 and the second set 122, the connecting in Action 303 may comprise connecting, temporarily, to some or all of the candidate parent nodes, iteratively, in each set, wherein each set has a respective fourth node 114, 116.

By connecting, in accordance with Action 303, to one temporary parent node or sequentially connecting to multiple temporary parent nodes, the first node 111 may exchange information, including information about its measurements, with one or several IAB topology-management network function(s), in accordance with Actions 304 and 305 described next.

Action 304

In this Action 304, the first node 111 may provide an indication, to the fourth node 114 operating in the communications network 100. That is, a node having topology-management function(s) in the communications network 100. The indication may indicate one or more of: a) an identity of the nodes in the plurality of candidate parent nodes 120, in the first set 121, and/or in the second set 122, b) the respective measurement, and c) additional information about the plurality of candidate parent nodes 120, the first set 121, and/or the second set 122.

The providing in this Action 304 may be understood as sending, e.g., via the first link 141, the ninth link 149, and the tenth link 150.

The indication may be, e.g., a report. With the measurement and identification of the candidate parent nodes, the first node 111 may compose a report for the topology-management function(s) in the IAB network, that is, the fourth node 114, which may be understood to have the intelligence to manage the topology. The node $N_i$ may provide the report by temporarily connecting to the IAB network, according to Action 303, and as exemplified further down. The report may include, but is not limited to, the per-link, that is, respective, measurement information between the target node and the candidate parent nodes, and the corresponding parent node's identification. As an example of the additional information that may be provided in this action 304, an indexing may also be used in the report to mark the respective report parts, for example, to inform the receiver(s) of the report about the report's extent. One example of report content may be as follows:

TABLE 1

Example of the initial report content from the first node 111, the target node.

| Measurement | PCID | Index |
|---|---|---|
| $RSRP(N_{1,2}, N_i)$ | $PCID_2$ | 4 |
| $RSRP(N_{1,1}, N_i)$ | $PCID_1$ | 3 |
| $RSRP(N_{2,1}, N_i)$ | $PCID_4$ | 2 |
| $RSRP(DN_1, N_i)$ | $PCID_3$ | 1 |
| $RSRP(N_{2,3}, N_i)$ | $PCID_5$ | 0 |

As may be seen, $RSRP(N_{1,2}, N_i)$ may indicate the RSRP measured by $N_i$ from $N_{1,2}$, and similarly for other fields in this columns, $PCID_2$, $PCID_1$, $PCID_4$, $PCID_3$ and $PCID_5$ may be understood to be the PCIDs for node $N_{1,2}$, $N_{1,1}$, $N_{2,1}$, $DN_1$, and $N_{2,3}$ respectively, and the, third, index column may be used to indicate, as an example of the additional information that may be provided in this action 304 the number of the remaining parts, lines, of the report.

The providing in Action 304 may be understood to be based, e.g., follow, be contingent upon, the connecting in Action 303.

Action 305

In this Action 305, the first node 111 receives, from the fourth node 114, information indicating a recommendation on which node within radio range to connect to, out of the plurality of candidate parent nodes 120. As stated earlier, the plurality of candidate parent nodes 120 comprises the first set 121 of candidate parent nodes and the second set 122 of candidate parent nodes. The third node 113 is enabled to be a donor node to the first node 111 in the first set 121, and the sixth node 116 is enabled to be a donor node to the first node 111 in the second set 122.

The receiving may be performed, e.g., via the third link 143, or the first link 141.

In some embodiments, the receiving 305, in this Action 305, from the fourth node 114 may be based on the provided indication in Action 304.

In some embodiments, the information may further comprise at least one of: a) a list of identities, e.g., PCID, of considered candidate parent nodes; b) respective additional information, e.g., the index described earlier, based on the provided additional information about the plurality of candidate parent nodes 120, the first set 121, and/or the second set 122; and c) an indication of a suitability of the recommendation, e.g., a "measure of goodness" if the first node 111 were to follow the recommendation. The indication of the suitability may be indicated as $value_1$ as a result of a performance metric, evaluated by a 'max{ }' operator.

Table 2 depicts a non-limiting example of the information that may be received from the fourth node 114, wherein the evaluation result and the nodes covered are provided as respective additional information. The third field may be used to tell the first node 111 which candidate parent nodes have been evaluated and accounted for in this feedback recommendation by the fourth node 114:

TABLE 2

| Recommendation | Evaluation result | Nodes covered (for case 2)) |
|---|---|---|
| 3 | value$_1$ = max {...} | {4, 3, 1} |

The topology-management function may be 1) centralized, in which case it may handle/access the topology-related information across all the candidate parent nodes, or 2) distributed such that each topology-management function may handle/access the topology-related information of part of the candidate parent nodes. Depending on which topology-management function may be available in the network, there may be two ways that the target node may exchange information with the topology-management function(s), as will be described later with illustrating examples.

In some embodiments wherein the topology-management function may be distributed, the receiving 305 may further comprise receiving the information, respectively, from the plurality of fourth nodes 130 comprising the fourth node 114 as respective information. The respective information may indicate a respective recommendation on which node out of the plurality candidate of parent nodes 120, out of the first set 121, and/or out of the second set 122 to connect to, that is, a recommendation from each of the fourth nodes in the plurality of fourth nodes 130. In the example of FIG. 2, this may be the fourth node 114 and the sixth node 116.

In some examples, the respective information may be received from the other fourth nodes, such as the sixth node 116, in the plurality of fourth nodes 130.

In some of such embodiments, the providing in Action 304 may further comprise indicating the received respective information from the other fourth nodes 116 in the plurality of fourth nodes 130.

In some of such embodiments, wherein the plurality of candidate parent nodes 120 may comprise two or more sets of candidate parent nodes such as the first set 121 and the second set 122, the connecting in Action 303 may comprise connecting, temporarily, to some or all of the candidate parent nodes, iteratively, in each set, wherein each set has a respective fourth node 114, 116. In some of such embodiments, the indication may further indicate, to each of the respective fourth nodes 114, 116, one or more of: i) the identity of the nodes in the respective set of the plurality of candidate parent nodes 120, the first set 121 and the second set 122, ii) the respective measurement, and c) additional information about the plurality of candidate parent nodes 120, the first set 121, and/or the second set 122.

In some of such embodiments wherein the topology-management function may be distributed, the respective information may further comprise at least one of: a) a respective list of identities of considered candidate parent nodes; b) respective additional information based on the provided additional information about the plurality of candidate parent nodes 120, the first set 121, and/or the second set 122; and c) a respective indication indicating a respective suitability, e.g., a respective "measure of goodness", of the respective recommendation.

Action 306

The first node 111, e.g., N$_i$, may then disconnect from the temporary parent node and reconnect to another node if the indicated parent node is different from its currently connected parent node. Then, the first node 111 may start the second cell-search iteration. It may disconnect from, e.g., N$_{1,2}$ and reconnect temporarily to one node among the remaining unevaluated candidate parent nodes that may provide the highest measurement, e.g., RSRP, or another metric, which may be e.g., N$_{2,1}$ in the example of FIG. 2 in the second set 122 of candidate parent nodes. The first node 111, e.g., N$_i$, may remove the report content related to the already evaluated candidate parent nodes, e.g., DN$_1$, N$_{1,1}$, N$_{1,2}$ and update, e.g., the related indices.

In this Action 306, the first node 111 may update a list of candidate parent nodes to consider, e.g., a list of not-yet considered candidate parent nodes, based on the list of identities and/or the respective list of identities received in Action 305.

In some examples, after performing the updating in Action 306, the first node 111 may determine whether the list of candidate parent nodes to consider is empty or not.

In some examples, after the first node 111 may determine that the updated list of candidate parent nodes to consider is not empty, e.g., that it has at least one value, the first node 111 may connect temporarily with other nodes in the plurality of candidate parent nodes 120, in the first set 121, and/or in the second set 122. The first node 111 may then proceed with performing, e.g., iteratively, Actions 304, 305, and 306 with the other nodes. For example, for N fourth nodes 114, e.g., donors, there may be N−1 loops, that is, N−1 iterations.

Action 307

In this Action 307, the first node 111 determines, out of the plurality of candidate parent nodes 120, a second node 112, or parent node, to establish a connection with. The second node 112 may be selected out of the plurality of candidate parent nodes 120, within radio range, out of the first set 121, and/or out of the second set 122.

The determining 307 is based on the received information.

Determining may be understood as calculating, or deriving, or selecting.

In some embodiments wherein the topology-management function may be distributed, the determining 307 may be further based on the received respective information, which may be considered, e.g., respective first information.

In some embodiments, the determining in this Action 307 may be based on at least one of: a) a first estimation of a respective end-to-end performance between the first node 111 and the third node 113, also known as donor node or end node, via a first candidate parent node 112, b) a second estimation of a respective end-to-end performance between the first node 111 and the third node 113 via another candidate parent node 115, c) a third estimation of a respective end-to-end performance between the first node 111 and a sixth node 116, and d) a fourth estimation of a respective impact of a respective connection to each of the candidate parent nodes in the plurality, on a traffic load of one or more upstream parent, or serving, nodes 115.

In some particular embodiments, the determining 307 may be based on the first estimation and the fourth estimation.

In some examples, the determining in Action 307 may be performed after the first node 111 determines that the updated list of candidate parent nodes to consider is empty.

Action 308

In this Action 308, the first node 111 initiates establishment of a connection or re-connection to the communications network 100 via the determined second node 112, as first-hop node.

The connection or re-connection may be performed, e.g., via the first link 141.

Figure 4:
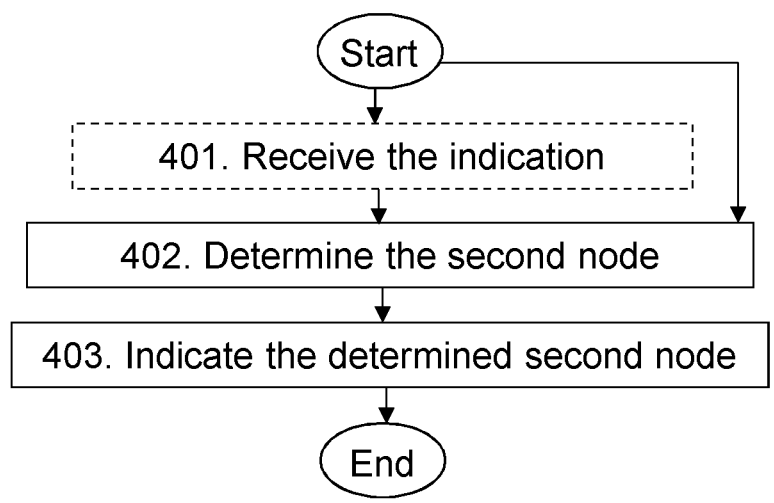
FIG. 4 depicts a flowchart of a method in a fourth node, according to embodiments herein.

Embodiments of a method, performed by the fourth node 114, will now be described with reference to the flowchart depicted in FIG. 4. The method may be understood to be for handling the access of the first node 111 to the communications network 100 in a multi-hop deployment. The fourth node 114 operates in the communications network 100.

Several embodiments are comprised herein. In some embodiments all the actions may be performed. In some embodiments, some actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 4, optional actions are indicated with dashed lines. Some actions may be performed in a different order than that shown in FIG. 4.

The detailed description of some of the following corresponds to the same references provided above, in relation to the actions described for the first node 111, and will thus not be repeated here to simplify the description. For example, the indication may be e.g., a report.

Any of the obtaining actions performed by fourth node 114 the may understood to be equally enabled to be performed by, e.g., by the sixth node 116.

Action 401

In this Action 401, the fourth node 114 may receive the indication from the first node 111. The indication, which may be the report, may indicate one or more of the following options.

In a first option, the identity of the nodes in the plurality of candidate parent nodes 120, in the first set 121, and/or in the second set 122, within radio range of the first node 111 having the respective measurement of the respective link between the first node 111 and each respective candidate parent node in the plurality of candidate parent nodes 120 exceeding the threshold.

In a second option, the respective measurement of the quality of a respective link between the first node 111 and each of the nodes in the plurality of candidate parent nodes 120, in the first set 121, and/or in the second set 122.

In a third option, the respective information from the plurality of other fourth nodes 116 operating in the communications network 100, the respective information indicating the respective recommendation on which node out of the plurality of candidate parent nodes 120, out of the first set 121, and/or out of the second set 122 to connect to.

In a fourth option, the respective indication, from the plurality of the other fourth nodes 116, the respective indication indicating a respective suitability of the respective recommendation.

In a fifth option, the additional information about the plurality of candidate parent nodes 120, the first set 121, and/or the second set 122.

In a sixth option, one or more of: i) the identity of the nodes in a respective set of the plurality of candidate parent nodes 120, the first set 121 and the second set 122, ii) the respective measurement, and iii) the additional information about the respective set of the plurality of candidate parent nodes 120, the first set 121 and the second set 122.

The receiving in this Action 401 may be understood as receiving, e.g., via the first link 141, the ninth link 149, and the tenth link 150.

Action 402

In this Action 402, the fourth node 114 determines, or selects, for the first node 111, which node within radio range of the first node 111 to connect to, out of the plurality of candidate parent nodes 120. As stated earlier, the plurality of candidate parent nodes 120 comprises the first set 121 of candidate parent nodes and/or the second set 122 of candidate parent nodes. The third node 113 is enabled to be the donor node to the first node 111 in the first set 121, and wherein the sixth node 116 is enabled to be the donor node to the first node 111 in the second set 122.

In other words, in this Action 402 the fourth node 114 may be understood to determine, or select its suggested second node 112, or parent node, for the first node 111 to establish a connection with.

In some embodiments, the determining in this Action 402 may be based on the received indication in Action 401.

In some embodiments, the determining in this Action 402 may be based on at least one of the following options.

In a first option, the first estimation of the respective end-to-end performance between the first node 111 and the third node 113, wherein the third node 113 is enabled to be the donor node to the first node 111.

In a second option, the second estimation of the respective end-to-end performance between the first node 111 and the third node 113, wherein the third node 113 is enabled to be the donor node to the first node 111 in the first set 121

In a third option the third estimation of the respective end-to-end performance between the first node 111 and the sixth node 116, wherein the sixth node 116 is enabled to be the donor node to the first node 111 in the second set 122 of the plurality of candidate parent nodes 120, In a fourth option, the fourth estimation of the respective impact of the respective connection to each of the candidate parent nodes in the plurality, on the traffic load of one or more upstream parent nodes 115, In a fifth option, the identity of the nodes in the plurality of candidate parent nodes 120, in the first set 121, and/or in the second set 122, within radio range of the first node 111 having the respective measurement of the respective link between the first node 111 and each respective candidate parent node in the plurality of candidate parent nodes 120 exceeding the threshold.

In a sixth option, the respective measurement of the quality of the respective link between the first node 111 and each of the nodes in the plurality of candidate parent nodes 120, in the first set 121, and/or in the second set 122, In a seventh option, the respective information from the plurality of other fourth nodes 116 operating in the communications network 100, the respective information indicating the respective recommendation on which node out of the plurality of candidate parent nodes 120, out of the first set 121, and/or out of the second set 122 to connect to, In an eighth option, the respective indication, from the plurality of the other fourth nodes 116, the respective indication indicating a respective suitability of the respective recommendation, and In a ninth option, the additional information about the plurality of candidate parent nodes 120, the first set 121, and/or the second set 122.

Connection Evaluation Metric Example

One metric example that the topology-management function(s), such as the fourth node 114, may use to calculate, in this Action 402, performance expectation when the target node may connect to one of the candidate parent node may be to check and measure the bottleneck of a certain path from the responsible donor to the target node, that is, the first node 111.

Let R(i,j) denote the performance measurement based on the link between node i and j. Using the nodes belonging to $DN_1$ as an example, the end-to-end performance expectation may be measured as follows:

TABLE 3

Example of the end-to-end performance calculation for node belonging to $DN_1$.

| Parent node to $N_i$ | Performance |
|---|---|
| $DN_1$ | $P(DN_1) = R(DN_1, N_i)$ |
| $N_{1,1}$ | $P(N_{1,1}) = \min \{R(DN_1, N_{1,1}), R(N_{1,1}, N_i)\}$ |
| $N_{1,2}$ | $P(N_{1,2}) = \min \{R(DN_1, N_{1,1}), R(N_{1,1}, N_{1,2}), R(N_{1,2}, N_i)\}$ |

The feedback value from the network, that is, the fourth node 114, may be $value_1 = \max \{P(DN_1), P(N_{1,1}), P(N_{1,2})\}$. The corresponding parent node providing value$_1$ may be recommended by $DN_1$.

To consider the impact of adding a target node on all the upstream parent nodes, the aggregated traffic at each parent node may be involved in the performance calculation, as in [3]. Let $\lambda_{1,1}$ and $\lambda_{1,2}$ denote a traffic measure of the access traffic load on nodes $N_{1,1}$ and $N_{1,2}$, respectively. The topology-management function, e.g., the fourth node 114, may know the Signal to Noise Ratio (SNR) values of the connected links between $DN_1$, $N_{1,1}$ and $N_{1,2}$. It may calculate the SNR values for the new candidate links between the target node, the first node 111, and its potential parent node $DN_1$, $N_{1,1}$ and $N_{1,2}$ based on the report from the target node. The topology-management function may also assume a default traffic measure $\bar{\lambda}$ for any target node, i.e., $\lambda_i = \bar{\lambda}$ before it is eventually connected to the network and may start reporting the traffic information.

The performance, which the responsible topology-management function may evaluate, may be the minimal rate-per-node-traffic along a certain path from $DN_1$ to $N_i$, where for Table 3:

Regarding $P(DN_1)$:

$R(DN_1, N_i) = \log_2(1+SNR(DN_1, N_i))/\lambda_i$

Regarding $P(N_{1,1})$:

$R(N_{1,1}, N_i) = \log_2(1+SNR(DN_1, N_i))/\lambda_i$ $R(DN_1, N_{1,1}) = \log_2(1+SNR(DN_1, N_{1,1}))/(\lambda_{1,1}+\lambda_i)$ Regarding $P(N_{1,2})$:

$R(N_{1,2}, N_i) = \log_2(1+SNR(N_{1,2}, N_i))/\lambda_i$ $R(N_{1,1}, N_{1,2}) = \log_2(1+SNR(N_{1,1}, N_{1,2}))/(\lambda_{1,2}+\lambda_i)$ $R(DN_1, N_{1,1}) = \log_2(1+SNR(DN_1, N_{1,1}))/(\lambda_{1,1}+\lambda_{1,2}+\lambda_i)$ The traffic measure $\lambda_{i,j}$ may not be the real-time traffic load from the access link since it may not be preferable if the IAB network topology change frequently. Instead, it may be the value reflecting the overall or long-term traffic expectation or measurement. For example, the normal area may give the traffic measure of 1 and the hot-zone may give the traffic measure of 3.

Action 403

In this Action 403, the fourth node 114 indicates, to the first node 111, the information indicating the recommendation on which determined node within radio range to connect to, in other words, its suggested second node 112, determined second node 112, or parent node, for the first node 111 to establish a connection with.

The indicating in this Action 403, may be to the first node 111, e.g., via the fourth link 144.

The indicating in this Action 403 may be understood as sending, e.g., via the first link 141, the ninth link 149, and the tenth link 150.

In some embodiments, the information may further comprise at least one of: a) the list of identities of considered candidate parent nodes; b) the respective additional information based on the provided additional information about the plurality of candidate parent nodes 120, the first set 121, and/or the second set 122; and c) the indication of the suitability of the determination, e.g., a "measure of goodness" of the recommendation.

In some embodiments, the indicating in this Action 403 may be performed by providing e.g., an index.

Some embodiments herein will now be further described with some further non-limiting examples.

In the following description, any reference to a/the target IAB node, target node, target IAB node ($N_i$), $N_i$, and/or new node may be understood to equally refer the first node 111; any reference to a/the candidate parent nodes may be understood to equally refer to the plurality of candidate parent nodes, or to any of the second node 112, fifth node 115, seventh node 117, eighth node 118 and/or ninth node 119; and any reference to a/the IAB topology-management network function, or topology-management network function may be understood to equally refer the fourth node 114, or the sixth node 116; any reference to a/the parent node may be understood to equally refer to any of the second node 112, fifth node 115, seventh node 117, eighth node 118 and/or ninth node 119; any reference to a/the network, and/or a/the IAB network may be understood to equally refer the communications network 100; any reference to a/the donor node may be understood to equally refer the fourth node 114, or the sixth node 116; any reference to a/the node $N_{1,2}$ may be understood to equally refer the second node 112; any reference to a/the node $N_{1,1}$ may be understood to equally refer the fifth node 115; any reference to a/the node $N_{2,1}$ may be understood to equally refer the seventh node 117; any reference to a/the node $N_{2,2}$ may be understood to equally refer the eighth node 118; any reference to a/the node $N_{2,3}$ may be understood to equally refer the ninth node 119; any reference to a/the node $DN_1$ may be understood to equally refer the third node 113; any reference to a/the node $DN_2$ may be understood to equally refer the sixth node 116.

The overall process may comprise the steps of: in a first step, the Mobile Termination (MT) function of the first node 111, the target IAB node, $N_i$ in FIG. 2, may search for, and measure the link performance of, candidate parent nodes already connected to the IAB network, in accordance with Action 301. In another step, by connecting, in accordance with Action 303, to one temporary parent node or sequentially connecting to multiple temporary parent nodes, the target node may exchange information, including information about its measurements, with one or several IAB topology-management network function(s), in accordance with Actions 304 and 305. In a further step, based on this exchange of information, the target node may eventually connect to the IAB network, in accordance with Action 308, via a parent node and set up as a fully functional IAB node.

Centralized Topology-Management Function

When there is a centralized topology-management function, the information exchange before the target node eventually connecting to a parent node may be as follows:

The MT function of the target node may, in accordance with Action 303, temporarily connect to the node that may provide the highest RSRP, or another metric, so as to be able to exchange information with the network. In the example of FIG. 2, it is assumed that the temporary parent node will be node $N_{1,2}$.

Figure 5:
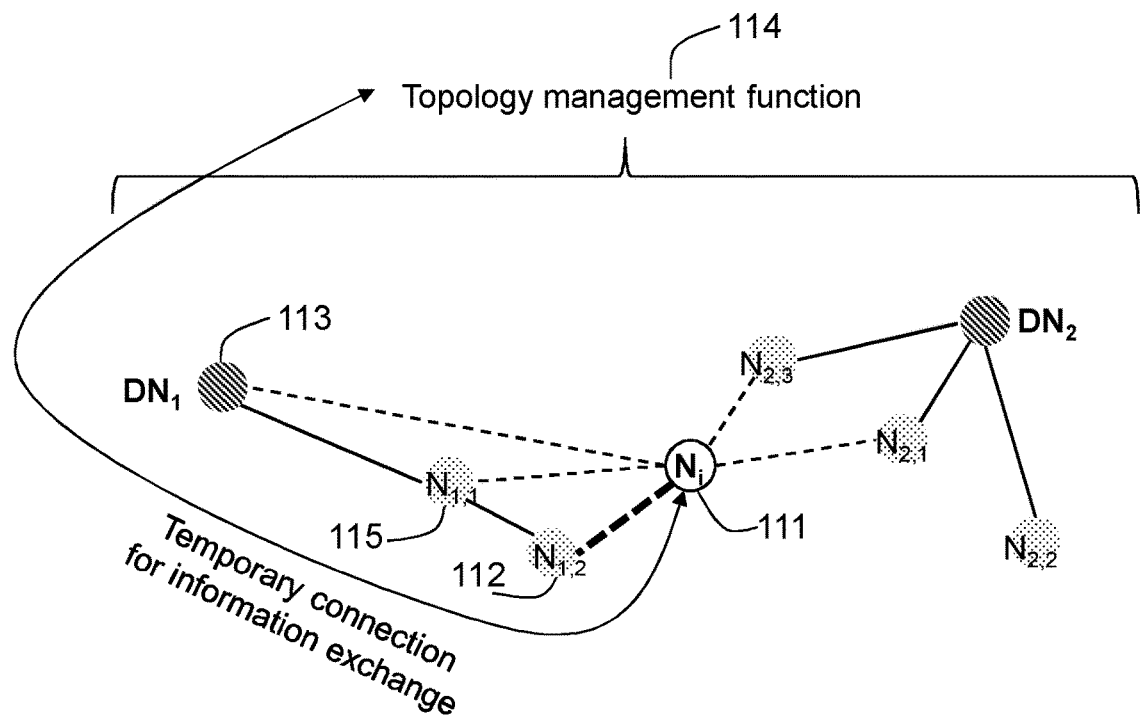
FIG. 5 is a schematic diagram illustrating an example of the method in the first node and the method in the fourth node, according to embodiments herein.

The measurement report, as an example of the indication as exemplified in Table 1, may then be sent, in accordance with Action 304, to the topology-management function along the connected backhaul links, as illustrated in FIG. 5. FIG. 5 is a schematic diagram illustrating a non-limiting example of a temporary connection for information exchange between the MT function of the target node and the centralized topology-management function, according to embodiments herein.

The topology-management function, e.g., the fourth node 114, may make use of the report from the target node $N_i$, as well as its knowledge about the already connected nodes and links, to, in accordance with Action 402, calculate/compare, e.g., the achievable end-to-end performance for the target node $N_i$ if it would connect to $DN_1$, $N_{1,1}$, $N_{1,2}$, $N_{2,1}$, or $N_{2,3}$. The calculation metric may also consider the target node's impact on all the upstream parent nodes. For example, the connection of the target node $N_i$ to $N_{1,2}$ may influence the performance of both $N_{1,1}$ and $N_{1,2}$ and UEs served by $N_{1,1}$ and $N_{1,2}$, since traffic may generally aggregate over links closer to the donor $DN_1$. Other influence may be that the additional hop may consume the resources and budget of both $N_{1,1}$ and $N_{1,2}$.

Based on the calculation/comparison results performed in Action 402, the topology-management function may, in accordance with Action 403, indicate one node out of $DN_1$, $N_{1,1}$, $N_{1,2}$, $N_{2,1}$, and $N_{2,3}$ for the target node to connect to. The connection indication may then be feedback to the target node $N_i$ along the temporary connection for information exchange.

According to the received parent node recommendation, the target node $N_i$ may then disconnect from the temporary parent node and reconnect to another node if the indicated parent node is different from its currently connected parent node. Then the target node $N_i$ may continue to set up as a fully functional IAB node.

Distributed Topology-Management Function

Figure 6:
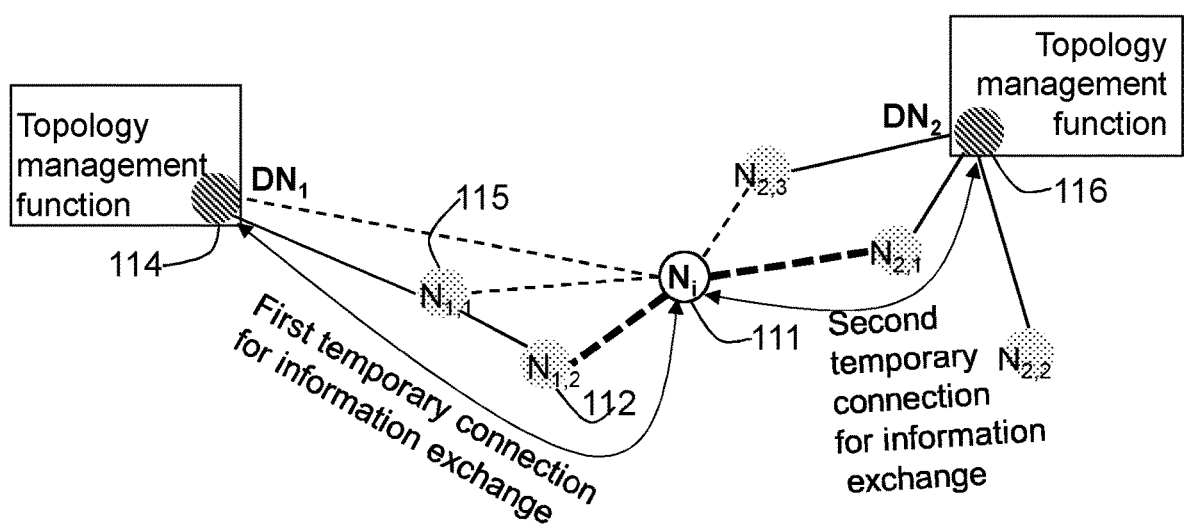
FIG. 6 is a schematic diagram illustrating an example of the method in the first node and the method in the fourth node, according to embodiments herein.

In the case regarding distributed topology-management functions, the exchange of link-quality information, as well as the generation and provisioning of feedback may in general be with any suitable IAB network function and may be understood to not be limited to be per donor node. For simplicity, but without loss of generality, this subsection just assumes that this function is located in donor nodes. However, each of the topology-management functions, e.g., the fourth node 114 and/or the sixth node 116, may be performed by a separate node, which is not a donor node. The overall information exchange process is depicted in FIG. 6. FIG. 6 is a schematic diagram illustrating a non-limiting example of sequentially temporary connections for information exchange between the MT function of the target node, that is, the first node 111, and the distributed topology-management functions, e.g., the fourth node 114 and the sixth node 116, according to embodiments herein.

Figure 7:
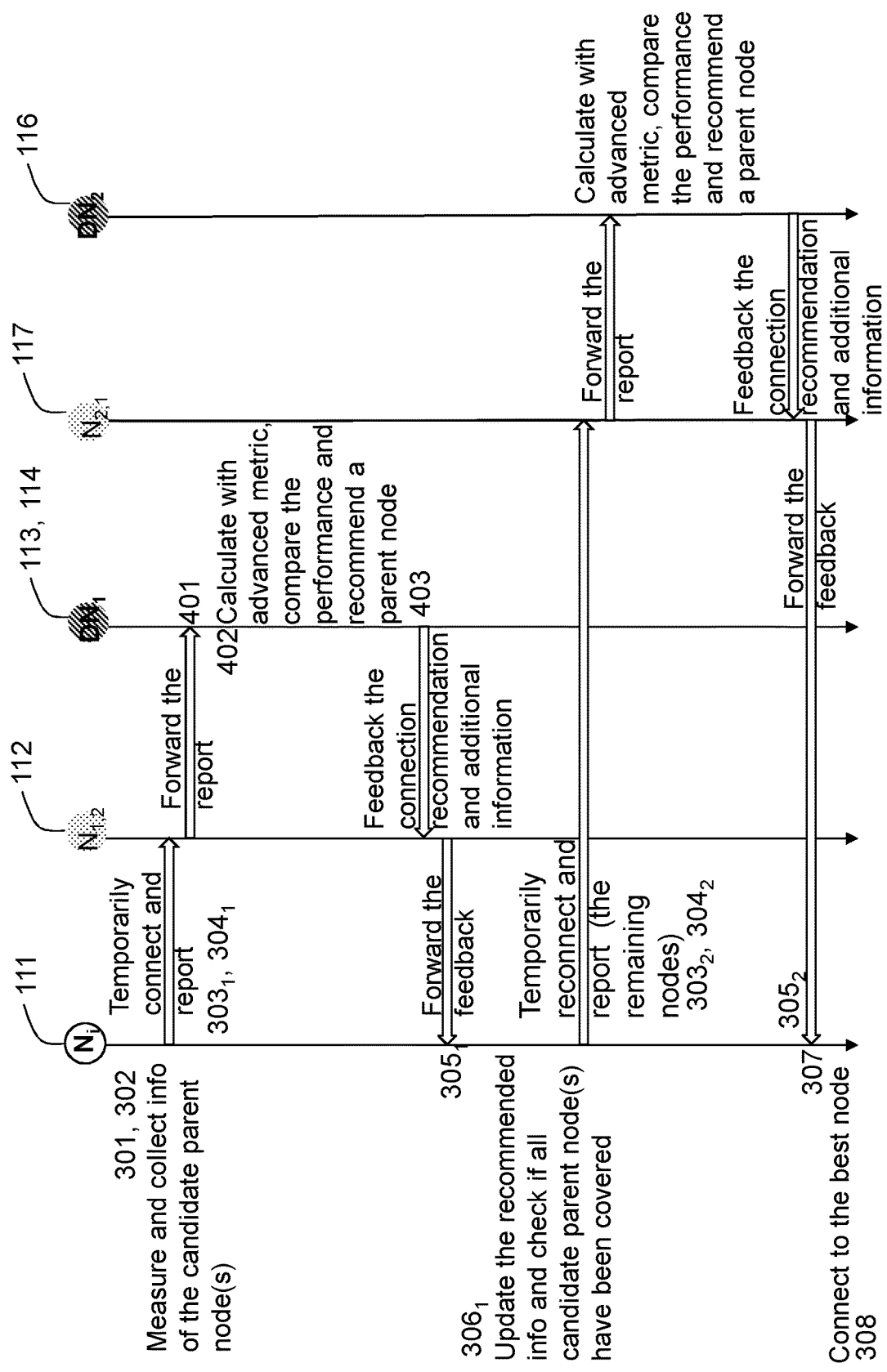
FIG. 7 is a schematic diagram illustrating an example of the method in the first node and the method in the fourth node, according to embodiments herein.

The process diagram is summarized in FIG. 7. FIG. 7 is a signalling diagram illustrating a non-limiting example of iterative cell search among nodes that belong to different donors considering the distributed topology-management functions located at respective donors, in accordance with embodiments herein. The reference numbers depicted for the actions correspond to those already described. The subscripts indicate different iterations of the respective actions. According to Action 301, the first node 111 may obtain the respective measurement of the quality of the respective link between the first node 111 and each of the nodes in the plurality of candidate parent nodes 120, in the first set 121, and/or in the second set 122. According to Action 302, the first node 111 may identify the nodes in the plurality of candidate parent nodes 120, based on the respective measurement exceeding the threshold.

Depending on the extent of details about node identifications the target node $N_i$ may decode from the received signals, the report content and the target node's behavior may be different:

1) If the target node may obtain the information about which donor node each candidate parent node belongs to, for example, a donor ID may be associated with each PCID, the target node $N_i$ may only send part of the report which relates to the nodes that belong to donor $DN_1$ to donor $DN_1$, that is, report about connections to $DN_1$, $N_{1,1}$ and $N_{1,2}$ only.

2) If the target node may not know the topology relation between the candidate parent nodes, it may need to send the whole report as exemplified in Table 1 to donor $DN_1$. Meanwhile, the target node (node $N_i$) may keep track of the remaining candidate parent nodes to be evaluated in set A={$PCID_2$, $PCID_1$, $PCID_4$, $PCID_3$, $PCID_5$}.

The above two situations will be referred to as case 1) and case 2) respectively hereinafter. Saying some nodes belong to a donor node, it may be understood to mean that those nodes may connect to the core network via the donor node.

To be able to exchange information with the first topology-management function, that is, the fourth node 114, which in this example located in $DN_1$, the target node $N_i$, that is, the first node 111, may, according to Action 303, temporarily connect to the node that provides the highest RSRP (or another metric). In the example of FIG. 2, it is assumed that it will be node $N_{1,2}$ in the first cell-search iteration. The target node may, according to Action 304, send the report to $N_{1,2}$, and $N_{1,2}$ may then forward the report to its donor $DN_1$.

$DN_1$ may be understood to have at least the following information:

a) the PCIDs of the nodes that belong to $DN_1$. In this example, that may be understood to be $PCID_2$, $PCID_1$, and $PCID_3$;

b) the quality of the connected links, which are the links between $DN_1$, $N_{1,1}$ and $N_{1,2}$;

c) the topology of the connected nodes, which are the nodes $DN_1$, $N_{1,1}$ and $N_{1,2}$; and d) the radio-resource related information about the already connected nodes, i.e., $DN_1$, $N_{1,1}$ and $N_{1,2}$, for example, the long-term expectation of the access traffic weights served by each node, or the remaining overhead budget, etc.

$DN_1$ may make use of the report from the target node $N_i$ together with its knowledge about the already connected nodes and links to, according to Action 402, calculate, e.g., the achievable end-to-end performance for the target node $N_i$ if it would connect to $DN_1$, $N_{1,1}$ or $N_{1,2}$. Regarding case 2), $DN_1$ may ignore the parts of report whose PCID do not belong to $DN_1$. The calculation may be based on a predefined metric that may be shared by all the donor nodes. The performance calculation may also be based on a donor individual metric or even on a variable set of metrics. The calculation metric may also consider the target node's impact on all the upstream parent nodes. For example, the connection of the target node $N_i$ to $N_{1,2}$ may influence the performance of both $N_{1,1}$ and $N_{1,2}$ and UEs served by $N_{1,1}$ and $N_{1,2}$, since traffic may be understood to generally aggregate over links closer to the donor $DN_1$. Other influence may be that the additional hop may consume the resources and budget of both $N_{1,1}$ and $N_{1,2}$.

Based on the calculation results, $DN_1$ may recommend one node out of $DN_1$, $N_{1,1}$, and $N_{1,2}$ for the target node to connect to. $DN_1$ may, according to Action 403, feedback the recommendation to the target node $N_i$ together with some additional information to assist the target node $N_i$ to continue the cell search, if needed. One example of the feedback content may be as follows:

TABLE 2

Example of feedback content from $DN_1$ in the first cell-search iteration.

| Recommendation | Evaluation result | Nodes covered (for case 2)) |
|---|---|---|
| 3 | $value_1 = \max \{\ldots\}$ | $\{4, 3, 1\}$ |

In this feedback example, $DN_1$ may first make a connection recommendation to the target node by notifying, as an example of additional information, the index, here $N_{1,1}$ is recommended. Note that in the first and third fields, the index number in the target node's initial report in Table 1 may be used to identify a certain node instead of the corresponding PCID so as to limit the dynamic range of possible values in this field. Node $N_{1,1}$ has index 3. The feedback may also contain a measure of goodness, indicated as values as a result of a performance metric, evaluated by the 'max{ }' operator, if node $N_i$ would follow the recommendation. For case 2), the third field may be used to tell the target node which candidate parent nodes have been evaluated and accounted for in this feedback recommendation by this donor.

The donor node $DN_1$ may provide the feedback to $N_{1,2}$, which may receive the feedback and forward it to the target node $N_i$.

The target node $N_i$ may save the information of the recommended node for further comparison. For case 2), the target node may also compare the nodes covered in the feedback with set A and update set A accordingly by removing the already evaluated nodes or cells, resulting in $A=\{PCID_4, PCID_5\}$.

Then, the target node may start the second cell-search iteration. It may disconnect from $N_{1,2}$ and reconnect temporarily, according to Action 303, to one node among the remaining unevaluated candidate parent nodes that may provide the highest RSRP, or another metric, which may be assumed is $N_{2,1}$ in the example of FIG. 2. The target node $N_i$ may remove the report content related to the already evaluated candidate parent nodes, which are $DN_1$, $N_{1,1}$, $N_{1,2}$, and update, according to Action 306, the related indices.

There may be two options of determining a final connection between node $N_i$ and its ideal parent, that is, e.g., second node 112:

According to a first option, Option 1, the target node $N_i$ itself may make the decision, according to Action 307, by comparing all recommendations from all involved donors.

According to a second option, Option 2, a donor node may make the decision, according to Action 402, by comparing the best measure of goodness achievable by one of the nodes belonging to it with the best measure of goodness from other donor nodes.

For option 1, the target node may send, according to Action 304, in case 1) part of the remaining report which relates to the node belonging to donor $DN_2$, or in case 2) the remaining part of the report, to the currently connected node $N_{2,1}$, which may be as follows:

TABLE 4

Example of report content from target node in second cell-search iteration for option 1.

| Measurement | PCID | Index |
|---|---|---|
| $RSRP(N_{2,1}, N_i)$ | $PCID_4$ | 1 |
| $RSRP(N_{2,3}, N_i)$ | $PCID_5$ | 0 |

For option 2, the target node may also, according to Action 304, add to the report about the up-to-now best measure of goodness from the previous donor(s)'s feedback and send it to the currently connected node $N_{2,1}$, which may be as follows:

TABLE 5

Example of report content from target node in second cell-search iteration for option 2.

| Measurement | PCID | Index |
|---|---|---|
| $value_1$ | — | # |
| $RSRP(N_{2,1}, N_i)$ | $PCID_4$ | 1 |
| $RSRP(N_{2,3}, N_i)$ | $PCID_5$ | 0 |

In the report, "#" may denote a special index. When noticing this index, the donor node may use this report part even if it may not relate to a PCID that the donor node may be aware of. A donor, $DN_2$ at this point, may, according to Action 402, compare its goodness of recommendation with the value referenced by the special index "#"; if the latter indicates a better goodness, the donor $DN_2$ may respect it and may indicate it would give the same recommendation in the feedback.

The target node may send, according to Action 304, the updated report to $N_{2,1}$, and $N_{2,1}$ may forward the report to its donor $DN_2$. $DN_2$ may do similarly to $DN_1$ and send the feedback, according to Action 403.

For option 1, the feedback may be as follows:

TABLE 6

Example of feedback content from $DN_2$ in the second cell-search iteration for option 1.

| Recommendation | Evaluation result | Nodes covered (for case 2)) |
|---|---|---|
| 1 | $value_2 = \max \{\ldots\}$ | $\{1, 0\}$ |

After receiving the feedback, according to Action 305, the target node $N_i$ may compare goodness $value_1$ and $value_2$ and save the related information about currently best parent node for further comparison, according to Action 307.

For option 2, based on the comparison result, the recommendation may either be a node belonging to current donor or the node referenced by the special index "#". If no node under $DN_2$ may give better goodness evaluation than the reported value referenced by the special index "#", $value_1$ in this case, the feedback provided in Action 403 may be as follows:

TABLE 7

Example 1 of feedback content from $DN_2$
in the second cell-search iteration for option 2.

| Recommendation | Evaluation result | Nodes covered (for case 2) |
|---|---|---|
| # | — | {1, 0} |

Otherwise, the feedback may be the same as Table 6.

The target node may receive, according to Action 305, the feedback forwarded by its temporary parent node $N_{2,1}$. After receiving the feedback, the target node $N_i$ may perform an update of set A in case 2) as stated in the first cell-search iteration; node $N_i$ may remove all nodes accounted for in the last feedback from set A. Node $N_i$ may, according to Action 303, reconnect temporarily to one node among the remaining unevaluated candidate parent nodes that may provide the highest RSRP, or another metric, and proceed as already before with connecting to nodes $N_{1,2}$ and $N_{2,1}$. If all candidate parent nodes have been evaluated, the target node $N_i$ may eventually connect, according to Action 308, to the best parent node as a fully functional IAB node. The best parent node may be determined, according to Action 307, by node $N_i$ itself according to highest goodness value in any donor feedback recommendation for option 1. For option 2, node $N_i$ may eventually connect, according to Action 308, to a parent according to the recommendation of the last donor feedback.

Certain embodiments disclosed herein may provide one or more of the following technical advantage(s), which may be summarized as follows.

The multi-hop deployment may be understood to be one of the key features of the new generation wireless backhauling networks, especially when the backhaul links may operate at the millimeter wave frequency range. The use of intermediate (relay) nodes may help extend the coverage and reduce the requirement on fiber availability when it comes to access densification.

When the target node, such as the first node 111, may be about to camp on a network where multi-hop connectivity exists, its achievable performance may be not only determined by the link quality provided by the node it may directly connect to, but also by all the upstream parent nodes' serving capability, which may include, but is not limited to, the per-link quality, available radio resources, signaling overhead, interference environment, etc. Those factors may also be considered for the target node to connect to a proper parent node.

The proposed method in embodiments herein to find the best directly serving parent node may be understood to be done by iterative cell search among candidate serving nodes/donors. During the cell searching process, the topology-related information may be exchanged between the target node and one/multiple topology-management network function(s) over temporary connection(s). The advantages of involving the topology-management function(s) in the cell search of an intermediate node may be understood to be that it may consider both the end-to-end performance that the target node may support as well as the potential impact of the target node on all the upstream serving or parent nodes along the multi-hop topology.

Figure 8:
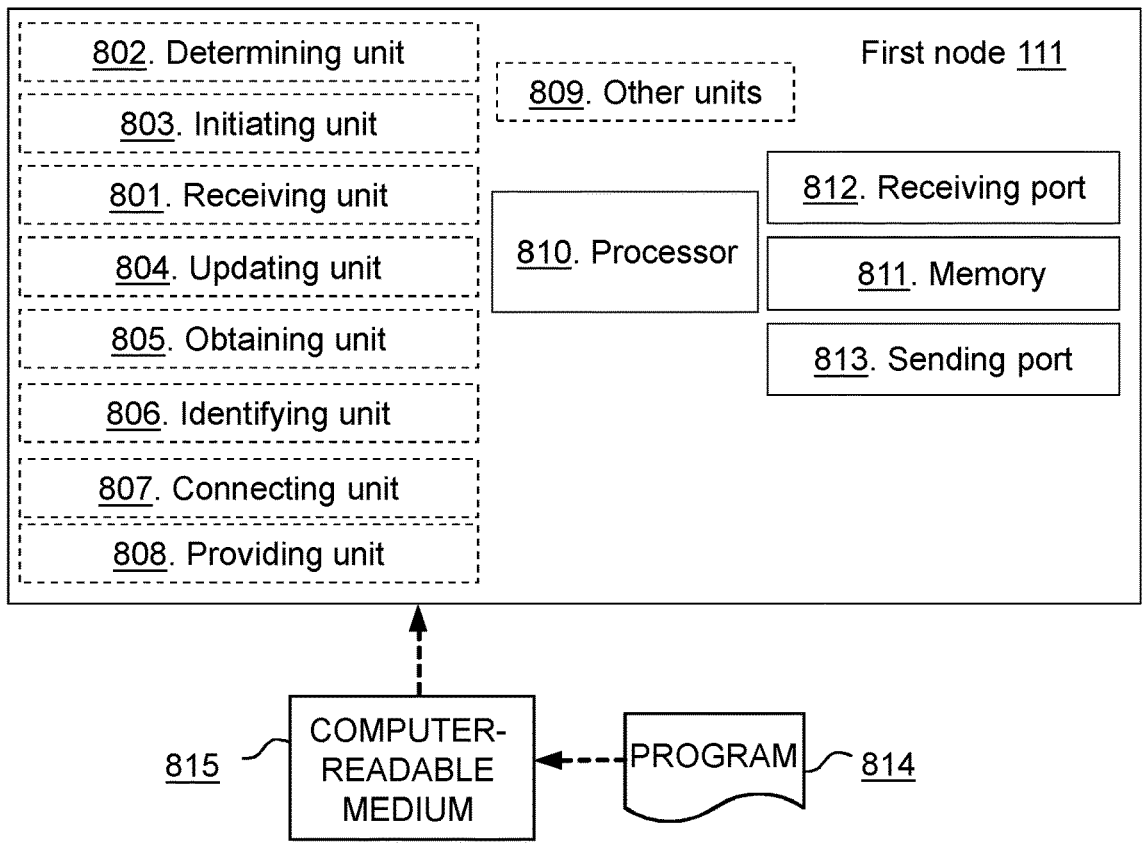
FIG. 8 is a schematic block diagram illustrating two non-limiting examples, a) and b), of a first node, according to embodiments herein.
Figure 8:
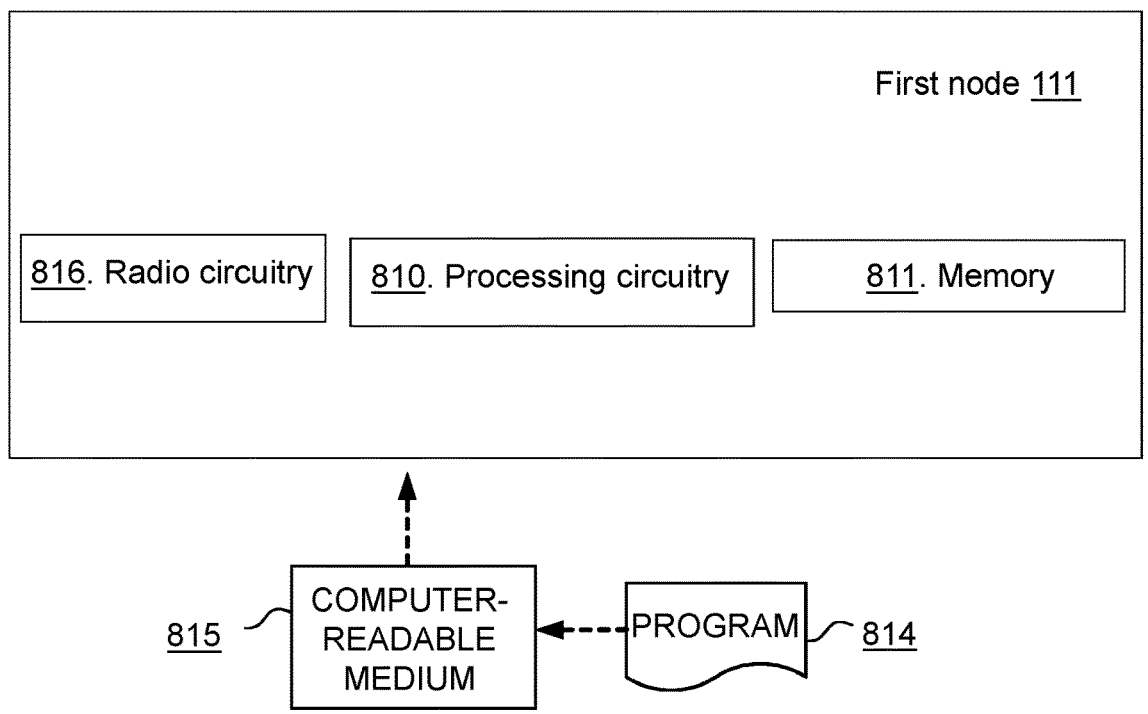

FIG. 8 depicts two different examples in panels a) and b), respectively, of the arrangement that the first node 111 may comprise. In some embodiments, the first node 111 may comprise the following arrangement depicted in FIG. 8a.

The first node 111 may be understood to be for handling access of the first node 111 to the communications network 100 in the multi-hop deployment. The first node 111 may be understood to be configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 8, optional units are indicated with dashed boxes.

The detailed description of some of the following corresponds to the same references provided above, in relation to the actions described for the first node 111, and will thus not be repeated here. For example, the first node 111 may also be referred to as a/the target node.

The first node 111 is configured to perform the receiving of Action 305, e.g. by means of a receiving unit 801 within the first node 111, configured to, receive, from the fourth node 114, the information. The information is configured to indicate the recommendation on which node within radio range to connect to, out of the plurality of candidate parent nodes 120. The plurality of candidate parent nodes 120 is configured to comprise the first set 121 of candidate parent nodes and the second set 122 of candidate parent nodes. The third node 113 is configured to be enabled to be the donor node to the first node 111 in the first set 121. The sixth node 116 is configured to be enabled to be the donor node to the first node 111 in the second set 122. The receiving unit 803 may be a processor 810 of the first node 111, or an application running on such processor.

The first node 111 is also configured to perform the determining of Action 307, e.g., by means of a determining unit 802 within the first node 111, configured to, determine, out of the plurality of candidate parent nodes 120, the second node 112 to establish a connection with. To determine is configured to be based on the received information. The determining unit 802 may be a processor 810 of the first node 111, or an application running on such processor.

In some embodiments, the first node 111 may be further configured to perform the initiating of Action 308, e.g., by means of an initiating unit 803 within the first node 111, configured to, initiate the establishment of the connection or re-connection to the communications network 100 via the determined second node 112, as first-hop node. The initiating unit 803 may be a processor 810 of the first node 111, or an application running on such processor.

In some embodiments, the first node 111 may be further configured to perform the updating of Action 306, e.g. by means of an updating unit 804, configured to, update the list of candidate parent nodes to consider, based on the list of identities and/or the respective list of identities. The updating unit 804 may be the processor 810 of the first node 111, or an application running on such processor.

In some embodiments, the first node 111 may be further configured to perform the obtaining of Action 301, e.g., by means of an obtaining unit 805, configured to obtain the respective measurement of the quality of the respective link between the first node 111 and each of the nodes in the plurality of candidate parent nodes 120, in the first set 121, and/or in the second set 122. The obtaining unit 805 may be the processor 810 of the first node 111, or an application running on such processor.

In some embodiments, the first node 111 may be further configured to perform the identifying of Action 302, e.g., by means of an identifying unit 806, configured to identify the nodes in the plurality of candidate parent nodes 120, based on the respective measurement of the respective link between the first node 111 and each respective candidate parent node in the plurality of candidate parent nodes 120 exceeding the threshold. The identifying unit 806 may be the processor 810 of the first node 111, or an application running on such processor.

In some embodiments, the first node 111 may be further configured to perform the connecting of Action 303, e.g., by means of a connecting unit 807, configured to connect, temporarily, to one or some of the nodes in the plurality of candidate parent nodes 120. The connecting unit 807 may be the processor 810 of the first node 111, or an application running on such processor.

In some embodiments, the first node 111 may be further configured to perform the providing of Action 304, e.g., by means of a providing unit 808, configured to provide the indication, to the fourth node 114. The indication may be configured to indicate one or more of: a) the identity of the nodes in the plurality of candidate parent nodes 120, in the first set 121, and/or in the second set 122, b) the respective measurement, and c) the additional information about the plurality of candidate parent nodes 120, the first set 121, and/or the second set 122. The obtaining unit 805 may be the processor 810 of the first node 111, or an application running on such processor.

In some of such embodiments, to receive from the fourth node 114 may be configured to be based on the provided indication.

In some embodiments, to receive may be further configured to comprise receiving the information, respectively, from the plurality of fourth nodes 130 comprising the fourth node 114 as respective information. The respective information may be configured to indicate the respective recommendation on which node out of the plurality candidate of parent nodes 120, out of the first set 121, and/or out of the second set 122 to connect to. To determine may be further configured to be based on the received respective information.

In some embodiments, to provide may be further configured to comprise indicating the received respective information from the other fourth nodes 116 in the plurality of fourth nodes 130.

In some embodiments, to connect may be configured to comprise connecting, temporarily, to some or all of the candidate parent nodes, iteratively, in each set, wherein each set may be configured to have the respective fourth node 114, 116. The indication may be further configured to indicate, to each of the respective fourth nodes 114, 116, one or more of: i) the identity of the nodes in the respective set of the plurality of candidate parent nodes 120, the first set 121 and the second set 122, ii) the respective measurement, and iii) the additional information about the plurality of candidate parent nodes 120, the first set 121, and/or the second set 122.

In some embodiments, to determine may be configured to be based on at least one of: a) the first estimation of the respective end-to-end performance between the first node 111 and the third node 113 via the first candidate parent node 112, b) the second estimation of the respective end-to-end performance between the first node 111 and the third node 113 via another candidate parent node 115, c) the third estimation of the respective end-to-end performance between the first node 111 and the sixth node 116, and d) the fourth estimation of the respective impact of the respective connection to each of the candidate parent nodes in the plurality, on the traffic load of one or more upstream parent nodes 115.

In some embodiments, the respective information may be further configured to comprise at least one of: a) the respective list of identities of considered candidate parent nodes; b) the respective additional information based on the provided additional information about the plurality of candidate parent nodes 120, the first set 121, and/or the second set 122; and c) the respective indication configured to indicate the respective suitability of the respective recommendation.

In some embodiments, the information may be further configured to comprise at least one of: a) the list of identities of considered candidate parent nodes; b) the respective additional information based on the provided additional information about the plurality of candidate parent nodes 120, the first set 121, and/or the second set 122; and c) the indication of the suitability of the recommendation.

Other units 809 may be comprised in the first node 111.

The embodiments herein in the first node 111 may be implemented through one or more processors, such as a processor 810 in the first node 111 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 811 comprising one or more memory units. The memory 811 is arranged to be used to store obtained information, store data, configurations, schedulings, and applications etc. to perform the methods herein when being executed in the first node 111.

In some embodiments, the first node 111 may receive information from, e.g., the second node 112, the fourth node 114, a wireless device, or any other node, such as e.g., the sixth node 116, through a receiving port 812. In some embodiments, the receiving port 812 may be, for example, connected to one or more antennas in first node 111. In other embodiments, the first node 111 may receive information from another structure in the communications network 100 through the receiving port 812. Since the receiving port 812 may be in communication with the processor 810, the receiving port 812 may then send the received information to the processor 810. The receiving port 812 may also be configured to receive other information.

The processor 810 in the first node 111 may be further configured to transmit or send information to e.g., the second node 112, the fourth node 114, a wireless device, or any other node, such as e.g., the sixth node 116, or another structure in the communications network 100, through a sending port 813, which may be in communication with the processor 810, and the memory 811.

Those skilled in the art will also appreciate that the receiving unit 801, the determining unit 802, the initiating unit 803, the updating unit 804, the obtaining unit 805, the identifying unit 806, the connecting unit 807, the providing unit 808, and the other units 809 described above may refer to a combination of analog and digital circuits, and/or one or more processors configured with software and/or firmware, e.g., stored in memory, that, when executed by the one or more processors such as the processor 810, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 801-809 described above may be implemented as one or more applications running on one or more processors such as the processor 810.

Thus, the methods according to the embodiments described herein for the first node 111 may be respectively implemented by means of a computer program 814 product, comprising instructions, i.e., software code portions, which, when executed on at least one processor 810, cause the at least one processor 810 to carry out the actions described herein, as performed by the first node 111. The computer program 814 product may be stored on a computer-readable storage medium 815. The computer-readable storage medium 815, having stored thereon the computer program 814, may comprise instructions which, when executed on at least one processor 810, cause the at least one processor 810 to carry out the actions described herein, as performed by the first node 111. In some embodiments, the computer-readable storage medium 815 may be a non-transitory computer-readable storage medium, such as a CD ROM disc, or a memory stick. In other embodiments, the computer program 814 product may be stored on a carrier containing the computer program 814 just described, wherein the carrier is one of an electronic signal, optical signal, radio signal, or the computer-readable storage medium 815, as described above.

The first node 111 may comprise a communication interface configured to facilitate communications between the first node 111 and other nodes or devices, e.g., the second node 112, the fourth node 114, a wireless device, or any other node. The interface may, for example, include a transceiver configured to transmit and receive radio signals over an air interface in accordance with a suitable standard.

In other embodiments, the first node 111 may comprise the following arrangement depicted in FIG. 8b. The first node 111 may comprise a processing circuitry 810, e.g., one or more processors such as the processor 810, in the first node 111 and the memory 811. The first node 111 may also comprise a radio circuitry 816, which may comprise e.g., the receiving port 812 and the sending port 813. The processing circuitry 810 may be configured to, or operable to, perform the method actions according to FIG. 3, FIGS. 5-7, and/or FIGS. 13-17, in a similar manner as that described in relation to FIG. 8a. The radio circuitry 816 may be configured to set up and maintain at least a wireless connection with the first node 111. Circuitry may be understood herein as a hardware component.

Hence, embodiments herein also relate to the first node 111 operative to operate in the communications network 100. The first node 111 may comprise the processing circuitry 810 and the memory 811, said memory 811 containing instructions executable by said processing circuitry 810, whereby the first node 111 is further operative to perform the actions described herein in relation to the first node 111, e.g., in FIG. 3, FIGS. 5-7, and/or FIGS. 13-17.

Figure 9:
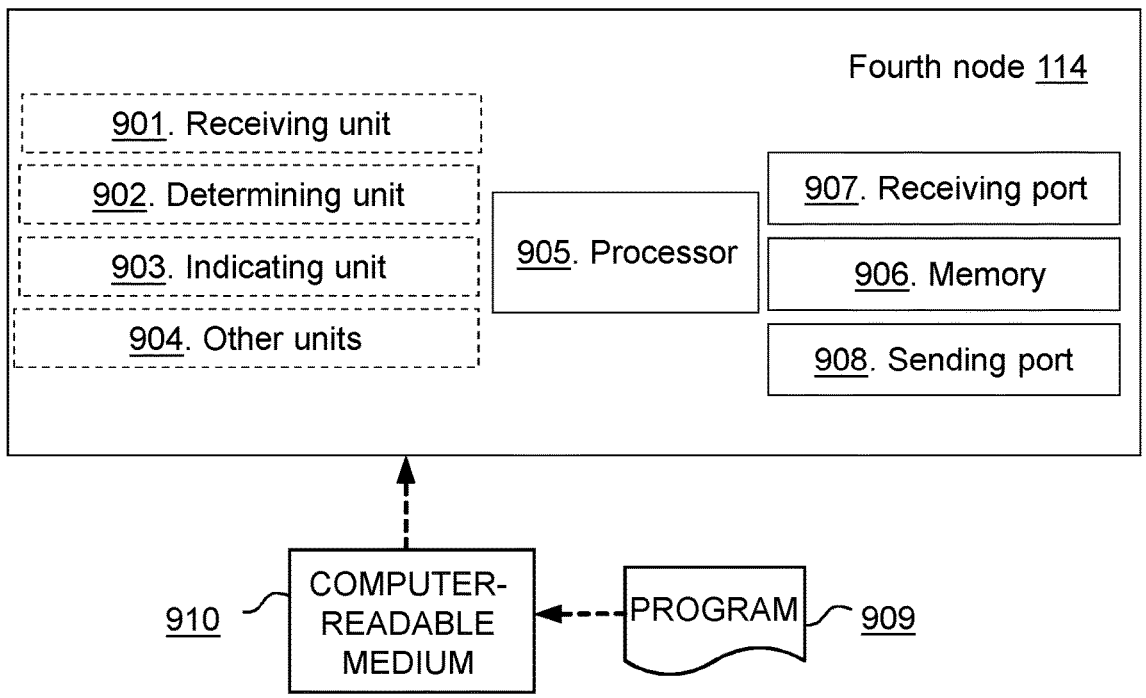
FIG. 9 is a schematic block diagram illustrating two non-limiting examples, a) and b), of a fourth node, according to embodiments herein.
Figure 9:
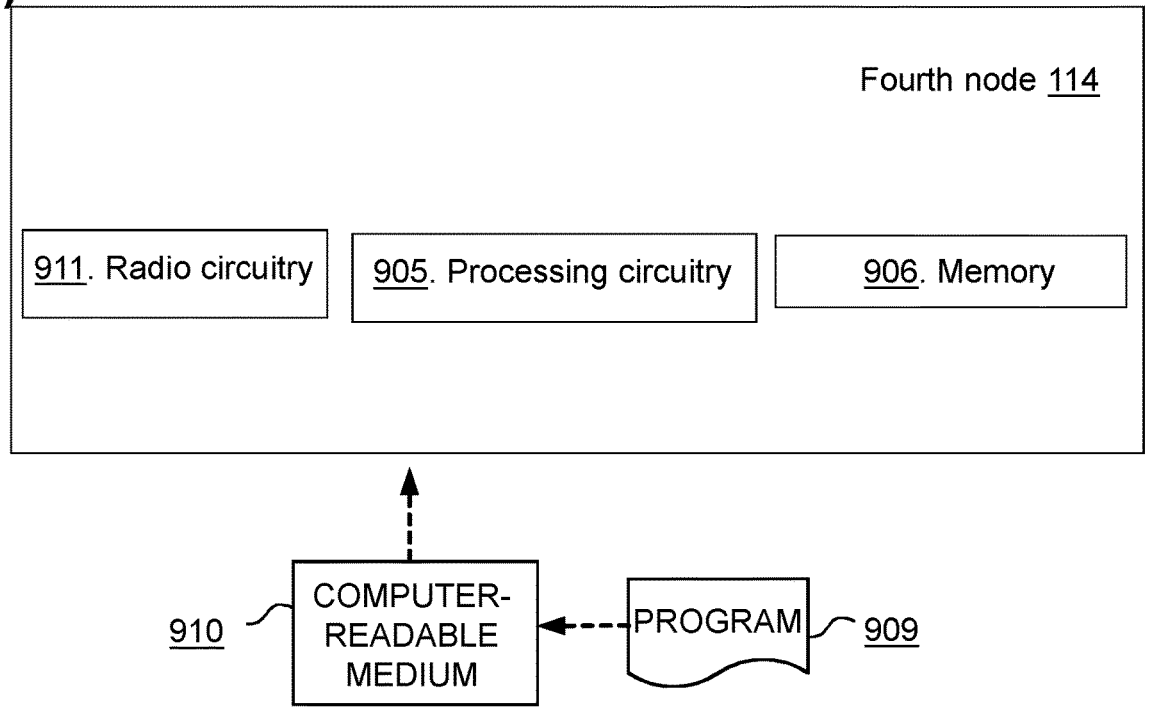

FIG. 9 depicts two different examples in panels a) and b), respectively, of the arrangement that the fourth node 114 may comprise. In some embodiments, the fourth node 114 may comprise the following arrangement depicted in FIG. 9a.

The fourth node 114 may be understood to be for handling access of the first node 111 to the communications network 100 in the multi-hop deployment. The fourth node 114 is configured to operate in the communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 9, optional units are indicated with dashed boxes.

The detailed description of some of the following corresponds to the same references provided above, in relation to the actions described for the fourth node 114, and will thus not be repeated here. For example, the first node 111 may also be referred to as a/the target node.

The fourth node 114 is configured to perform the determining of Action 402, e.g. by means of a determining unit 902 within the fourth node 114, configured to, determine, for the first node 111, which node within radio range of the first node 111 to connect to, out of the plurality of candidate parent nodes 120. The plurality of candidate parent nodes 120 is configured to comprise the first set 121 of candidate parent nodes and/or the second set 122 of candidate parent nodes. The third node 113 is configured to be enabled to be the donor node to the first node 111 in the first set 121. The sixth node 116 is configured to be enabled to be a donor node to the first node 111 in the second set 122. The determining unit 402 may be the processor 905 of the fourth node 114, or an application running on such processor.

The fourth node 114 is also configured to perform the indicating of Action 403, e.g., by means of an indicating unit 903 within the fourth node 114, configured to, indicate, to the first node 111, the information configured to indicate the recommendation on which determined node within radio range to connect to. The indicating unit 903 may be a processor 905 of the fourth node 114, or an application running on such processor.

In some embodiments, the fourth node 114 may be further configured to perform the receiving of Action 402, e.g., by means of a receiving unit 901 within the fourth node 114, configured to receive the indication from the first node 111. The indication may be configured to indicate one or more of: a) the identity of the nodes in the plurality of candidate parent nodes 120, in the first set 121, and/or in the second set 122, within radio range of the first node 111 having the respective measurement of the respective link between the first node 111 and each respective candidate parent node in the plurality of candidate parent nodes 120 exceeding the threshold, b) the respective measurement of the quality of the respective link between the first node 111 and each of the nodes in the plurality of candidate parent nodes 120, in the first set 121, and/or in the second set 122, c) the respective information from the plurality of other fourth nodes 116 configured to operate in the communications network 100, the respective information being configured to indicate the respective recommendation on which node out of the plurality of candidate parent nodes 120, out of the first set 121, and/or out of the second set 122 to connect to, d) the respective indication, from the plurality of the other fourth nodes 116, the respective indication being configured to indicate the respective suitability of the respective recommendation, e) the additional information about the plurality of candidate parent nodes 120, the first set 121, and/or the second set 122, and f) the one or more of: i) the identity of the nodes in the respective set of the plurality of candidate parent nodes 120, the first set 121 and the second set 122, ii) the respective measurement, and iii) the additional information about the respective set of the plurality of candidate parent nodes 120, the first set 121 and the second set 122. In some of such embodiments, to determine may be configured to be based on the indication configured to be received. The receiving unit 901 may be the processor 905 of the fourth node 114, or an application running on such processor.

In some embodiments, to determine may be configured to be based on at least one of: a) the first estimation of the respective end-to-end performance between the first node 111 and the third node 113, wherein the third node 113 may be configured to be enabled to be a donor node to the first node 111, b) the second estimation of the respective end-to-end performance between the first node 111 and the third node 113, wherein the third node 113 may be configured to be enabled to be the donor node to the first node 111 in the first set 121, c) the third estimation of the respective end-to-end performance between the first node 111 and the sixth node 116, wherein the sixth node 116 may be configured to be enabled to be the donor node to the first node 111 in the second set 122 of the plurality of candidate parent nodes 120, d) the fourth estimation of the respective impact of the respective connection to each of the candidate parent nodes in the plurality, on the traffic load of one or more upstream parent nodes 115, e) the identity of the nodes in the plurality of candidate parent nodes 120, in the first set 121, and/or in the second set 122, within radio range of the first node 111 having the respective measurement of the respective link between the first node 111 and each respective candidate parent node in the plurality of candidate parent nodes 120 exceeding the threshold, f) the respective measurement of the quality of the respective link between the first node 111 and each of the nodes in the plurality of candidate parent nodes 120, in the first set 121, and/or in the second set 122, g) the respective information from the plurality of other fourth nodes 116 configured to operate in the communications network 100, the respective information being configured to indicate the respective recommendation on which node out of the plurality of candidate parent nodes 120, out of the first set 121, and/or out of the second set 122 to connect to, h) the respective indication, from the plurality of the other fourth nodes 116, the respective indication being configured to indicate a respective suitability of the respective recommendation, and i) the additional information about the plurality of candidate parent nodes 120, the first set 121, and/or the second set 122.

In some embodiments, the information may be further configured to comprise at least one of: a) the list of identities of considered candidate parent nodes; b) the respective additional information based on the provided additional information about the plurality of candidate parent nodes 120, the first set 121, and/or the second set 122; and c) the indication of the suitability of the determination.

Other units 904 may be comprised in the fourth node 114.

The embodiments herein in the fourth node 114 may be implemented through one or more processors, such as a processor 905 in the fourth node 114 depicted in FIG. 9a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the fourth node 114. One such carrier may be in the form of a CD ROM disc. It is however feasible with other data carriers such as a memory stick. The computer program code may furthermore be provided as pure program code on a server and downloaded to the fourth node 114.

The fourth node 114 may further comprise a memory 906 comprising one or more memory units. The memory 906 is arranged to be used to store obtained information, store data, configurations, schedulings, and applications etc. to perform the methods herein when being executed in the fourth node 114.

In some embodiments, the fourth node 114 may receive information from, e.g., the second node 112, the first node 111, a wireless device, or any other node, through a receiving port 907. In some embodiments, the receiving port 907 may be, for example, connected to one or more antennas in the fourth node 114. In other embodiments, the fourth node 114 may receive information from another structure in the communications network 100 through the receiving port 907. Since the receiving port 907 may be in communication with the processor 905, the receiving port 907 may then send the received information to the processor 905. The receiving port 907 may also be configured to receive other information.

The processor 905 in the fourth node 114 may be further configured to transmit or send information to e.g., the second node 112, the first node 111, a wireless device, or any other node, or another structure in the communications network 100, through a sending port 908, which may be in communication with the processor 905, and the memory 906.

Those skilled in the art will also appreciate that the receiving unit 901, the determining unit 902, the indicating unit 903 and the other units 904 described above may refer to a combination of analog and digital circuits, and/or one or more processors configured with software and/or firmware, e.g., stored in memory, that, when executed by the one or more processors such as the processor 905, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 901-904 described above may be implemented as one or more applications running on one or more processors such as the processor 905.

Thus, the methods according to the embodiments described herein for the fourth node 114 may be respectively implemented by means of a computer program 909 product, comprising instructions, i.e., software code portions, which, when executed on at least one processor 905, cause the at least one processor 905 to carry out the actions described herein, as performed by the fourth node 114. The computer program 909 product may be stored on a computer-readable storage medium 910. The computer-readable storage medium 910, having stored thereon the computer program 909, may comprise instructions which, when executed on at least one processor 905, cause the at least one processor 905 to carry out the actions described herein, as performed by the fourth node 114. In some embodiments, the computer-readable storage medium 910 may be a non-transitory computer-readable storage medium, such as a CD ROM disc, or a memory stick. In other embodiments, the computer program 909 product may be stored on a carrier containing the computer program 909 just described, wherein the carrier is one of an electronic signal, optical signal, radio signal, or the computer-readable storage medium 910, as described above.

The fourth node 114 may comprise a communication interface configured to facilitate communications between the fourth node 114 and other nodes or devices, e.g., the second node 112, the first node 111, a wireless device, or any other node, or another structure. The interface may, for example, include a transceiver configured to transmit and receive radio signals over an air interface in accordance with a suitable standard.

In other embodiments, the fourth node 114 may comprise the following arrangement depicted in FIG. 9b. The fourth node 114 may comprise a processing circuitry 905, e.g., one or more processors such as the processor 905, in the fourth node 114 and the memory 906. The fourth node 114 may also comprise a radio circuitry 911, which may comprise e.g., the receiving port 907 and the sending port 908. The processing circuitry 905 may be configured to, or operable to, perform the method actions according to FIG. 4, FIGS. 5-7, and/or FIGS. 13-17, in a similar manner as that described in relation to FIG. 9a. The radio circuitry 911 may be configured to set up and maintain at least a wireless connection with the first node 111, the second node 112, the fifth node 115, the sixth node 116 and/or any other node. Circuitry may be understood herein as a hardware component.

Hence, embodiments herein also relate to the fourth node 114 operative to operate in the communications network 100. The fourth node 114 may comprise the processing circuitry 905 and the memory 906, said memory 906 containing instructions executable by said processing circuitry 905, whereby the fourth node 114 is further operative to perform the actions described herein in relation to the fourth node 114, e.g., in FIG. 4, and/or FIGS. 13-17.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Examples Related to Embodiments Herein

Some other examples related to embodiments herein will now be described.

Several examples are comprised herein. It should be noted that the examples herein are not mutually exclusive. Components from one examples may be tacitly assumed to be present in another examples and it will be obvious to a person skilled in the art how those components may be used in the other exemplary embodiments.

More specifically, the following are examples related to a first node, such as the first node 111, e.g., a first gNB, and examples related to a fourth node, such as the fourth node 114, e.g., a second gNB.

The first node 111 examples relate to FIG. 10, FIG. 8 and FIGS. 12-17.

A method, performed by a node, such as the first node 111, which may also be known as a target node, is described herein. The method may be understood to be for handling access of the first node 111 to a communications network 100. The access to the communications network 100 may be in a multi-hop deployment.

The method may comprise one or more of the following actions.

Figure 10:
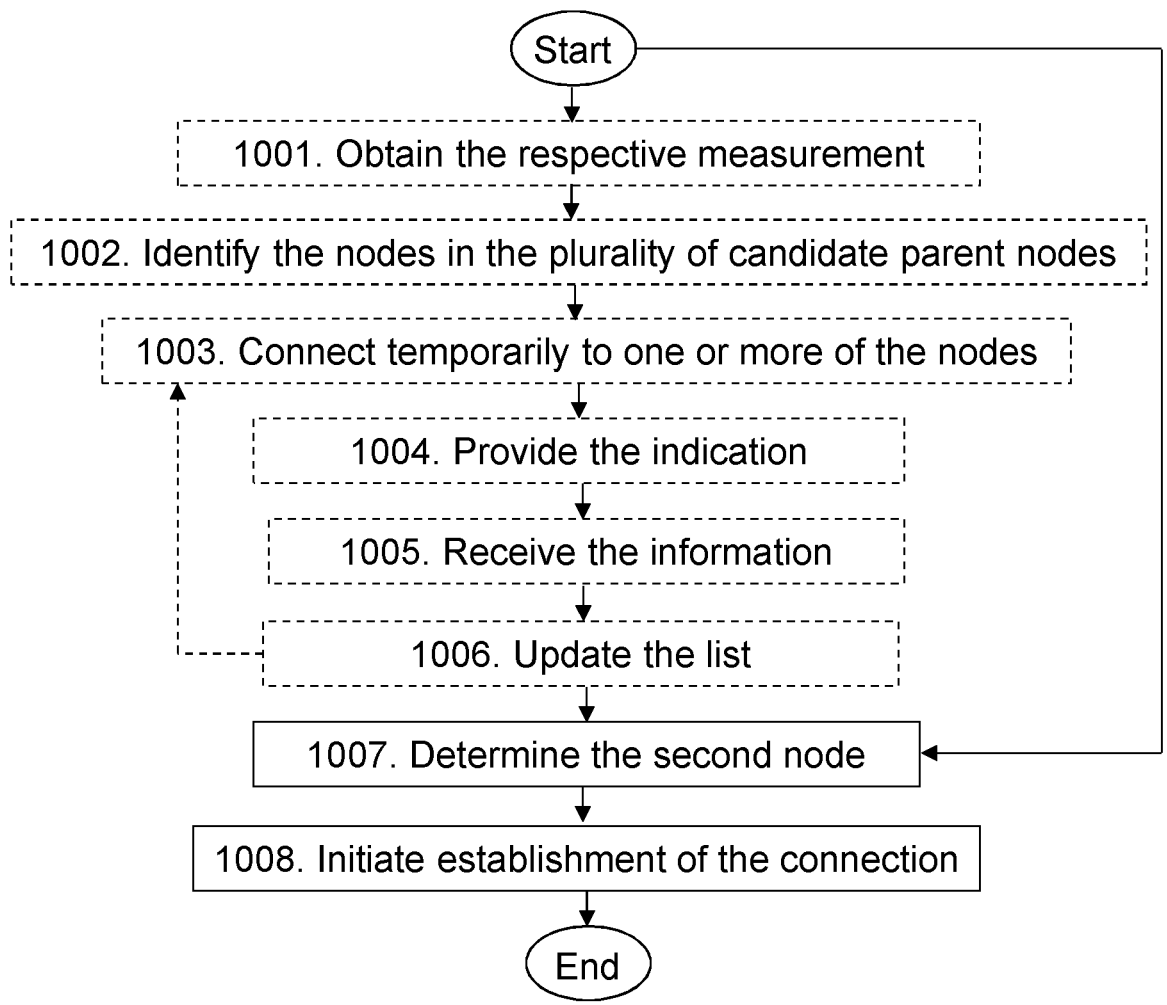
FIG. 10 depicts a flowchart of a method in a first node, according to examples related to embodiments herein.
Figure 11:
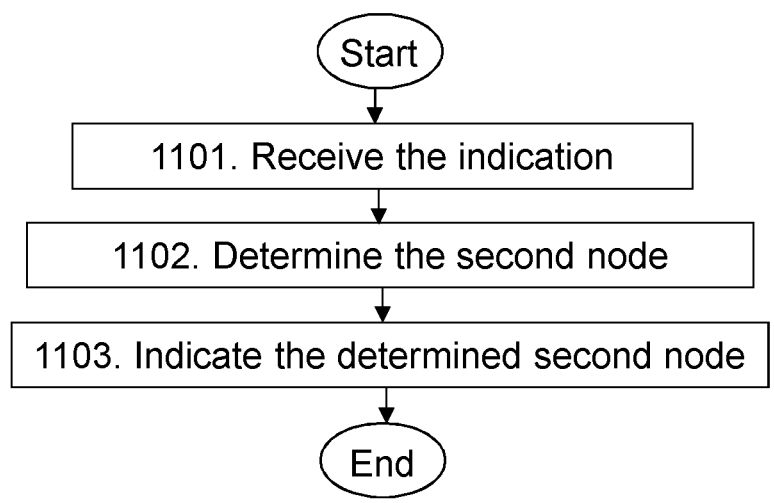
FIG. 11 depicts a flowchart of a method in a fourth node, according to examples related to embodiments herein.

In some examples all the actions may be performed. One or more examples may be combined, where applicable. All possible combinations are not described to simplify the description. Some actions may be performed in a different order than that shown in FIG. 10. In FIG. 10, actions which may be optional in some examples are depicted with dashed boxes. In some examples, Actions 1001-1004 may be performed. In other examples, such as that depicted in FIG. 10, Actions 1007-1008 may be performed. In some examples, Actions 1001-1006 may be performed, wherein Actions 1003-1006 are performed iteratively, as described below, e.g., in a series of cell-search iterations.

Determining 1007, or selecting, a second node 112, or parent node, to establish a connection with. The first node 111 may be configured to perform this determining 1007 action, e.g. by means of a determining unit 802 within the first node 111, configured to perform this action. The determining unit 802 may be a processor 810 of the first node 111, or an application running on such processor.

The second node 112 may be selected out of a plurality of candidate parent nodes 120, within radio range, out of the first set 121, and/or out of the second set 122.

Determining may be understood as calculating, or deriving.

The determining 1007 may be based on at least one of:
a first estimation of a respective end-to-end performance between the first node 111 and a third node 113, also known as donor node or end node, wherein the first node 111 may be enabled to access a backhaul connection of the third node 113 to the communications network 100 via, respectively, each candidate parent node in the plurality of candidate parent nodes 120,
a second estimation of a respective end-to-end performance between the first node 111 and a third node 113, also known as donor node or end node, wherein the first node 111 may be enabled to access a backhaul connection of the third node 113 to the communications network 100 via, respectively, each candidate parent node in a first set 121 of the plurality of candidate parent nodes 120,
a third estimation of a respective end-to-end performance between the first node 111 and a sixth node 116, also known as other donor node or other end node, wherein the first node 111 may be enabled to access a backhaul connection of the sixth node 116 to the communications network 100 via, respectively, each candidate parent node in a second set 122 of the plurality of candidate parent nodes 120, or
a fourth estimation of a respective impact of a respective connection to each of the candidate parent nodes in the plurality, on, e.g., a traffic load of, one or more upstream serving, or parent, nodes 115.

In some embodiments, the determining 1007 may be based on the first estimation and the fourth estimation.

Initiating 1008 establishment of a connection or re-connection to the communications network 100 via the determined second node 112, e.g., as first-hop node. The first node 111 may be configured to perform this initiating 1008 action, e.g. by means of an initiating unit 802 within the first node 111, configured to perform this action. The initiating unit 802 may be a processor 810 of the first node 111, or an application running on such processor.

The connection or re-connection may be performed, e.g., via the first link 141.

In some examples, the method may further comprise one or more of the following actions:

Receiving 1005 information, from a fourth node 114 operating in the communications network 100. The first node 111 may be configured to perform this receiving action 1005, e.g. by means of a receiving unit 801, configured to perform this action. The receiving unit 801 may be a processor 810 of the first node 111, or an application running on such processor.

The information, e.g., first information, may indicate a recommendation on which node out of the plurality of candidate parent nodes 120, out of the first set 121, and/or out of the second set 122, to connect to. The determining 1007 may be further based on the received information.

The receiving may be performed, e.g., via the third link 143, or the first link 141.

The information may further comprise a list of identities of considered candidate parent nodes.

In some examples, the receiving 1005 may further comprise receiving the information, respectively, from a plurality of fourth nodes 130 comprising the fourth node 114, e.g., as respective information. The respective information may indicate a respective recommendation on which node out of the plurality candidate of parent nodes 120, out of the first set 121, and/or out of the second set 122 to connect to. The determining 1007 may be further based on the received respective information, which may be considered, e.g., respective first information.

In some examples, the respective information may be received from the other fourth nodes 116 in the plurality of fourth nodes 130.

The respective information may further comprise a respective list of identities of considered candidate parent nodes.

Updating 1006, e.g., a list of candidate parent nodes to consider, e.g., a list of not-yet considered candidate parent nodes. The first node 111 may be configured to perform this updating action 1006, e.g., by means of an updating unit 804 within the first node 111, configured to perform this action. The updating unit 804 may be the processor 810 of the first node 111, or an application running on such processor.

The updating 1006 may be based on the list of identities and/or the respective list of identities.

In some examples, after performing the updating in Action 1006, the first node 111 may determine whether the list of candidate parent nodes to consider is empty or not.

In some examples, the determining in Action 1007 may be performed after the first node 111 determines that the updated list of candidate parent nodes to consider is empty.

Obtaining 1001 a respective measurement of a quality of a respective link between the first node 111 and each of the nodes: in the plurality of candidate parent nodes 120, in the first set 121, and/or in the second set 122.

The first node 111 may be configured to perform this obtaining 1001 action, e.g. by means of an obtaining unit 805 within the first node 111, configured to perform this action. The obtaining unit 805 may be the processor 810 of the first node 111, or an application running on such processor.

Obtaining may be performed, e.g., via the first link 141, the second link 142, the third link 143, the fifth link 145, and/or the sixth link 146.

Identifying 1002 the nodes in the plurality of candidate parent nodes 120, in the first set 121, and/or in the second set 122. The first node 111 may be configured to perform this identifying 1002 action, e.g. by means of an identifying unit 806 within the first node 111, configured to perform this action. The identifying unit 806 may be the processor 810 of the first node 111, or an application running on such processor.

The identifying 1002 may be based on the respective measurement of the respective link between the first node 111 and each respective candidate parent node in the plurality of candidate parent nodes 120, in the first set 121, and/or in the second set 122, exceeding a threshold.

The threshold may be a value. For example, the threshold may be e.g., any value that any wireless device, e.g., a UE, may have/decide when it may or may not, e.g., because radio coverage is bad, connect to a RAN.

Connecting 1003, temporarily, to one, some, or all, of the nodes in the plurality of candidate parent nodes 120, in the first set 121, and/or in the second set 122. The first node 111 may be configured to perform this connecting 1003 action, e.g. by means of a connecting unit 807 within the first node 111, configured to perform this action. The connecting unit 807 may be the processor 810 of the first node 111, or an application running on such processor.

Providing 1004 an indication, e.g., a report. The first node 111 may be configured to perform this providing 1004 action, e.g. by means of a providing unit 808 within the first node 111, configured to perform this action. The providing unit 808 may be the processor 810 of the first node 111, or an application running on such processor.

The providing in Action 1004 may be understood to be based, e.g., follow, be contingent upon, the connecting in Action 1003.

The providing of the indication may be, to a fourth node 114 operating in the communications network 100. The indication may indicate one or more of:

an identity of the nodes in the plurality of candidate parent nodes 120, in the first set 121, and/or in the second set 122, the respective measurement, or additional information about the nodes in: the plurality of candidate parent nodes 120, the first set 121, and/or the second set 122.

In some embodiments, the providing 1004 may further comprise indicating:

the received respective information from the other fourth nodes 116 in the plurality of fourth nodes 130.

In some embodiments, the plurality of candidate parent nodes 120 may comprise two or more sets of candidate parent nodes such as the first set 121 and the second set 122. In some of such embodiments:

a. the connecting 1003 may comprise connecting, temporarily, to some or all of the candidate parent nodes, iteratively, in each set, wherein each set has a respective fourth node 114, 116, and b. the first node 111, e.g., via the indication, may further indicate to each of the respective fourth nodes 114, 116, one or more of:
  i. the identity of the nodes in the respective set of the plurality of candidate parent nodes 120, the first set 121 and/or the second set 122, or
  ii. the respective measurement.

In some examples, after the first node 111 determines that the updated list of candidate parent nodes to consider is not empty, e.g., that it has at least one value, the first node 111 may connect temporarily with other nodes in the plurality of candidate parent nodes 120, in the first set 121, and/or in the second set 122. The first node 111 may then proceed with performing, e.g., iteratively, Actions 1004, 1005, and 1006 with the other nodes. For example, for N fourth nodes 114, e.g., donors, there may be N−1 loops, that is N−1 iterations.

Other units 809 may be comprised in the first node 111.

The first node 111 may also be configured to communicate user data with a host application unit in a host computer 1310, e.g., via another link such as 1350.

In FIG. 8, optional units are indicated with dashed boxes.

The first node 111 may comprise an interface unit to facilitate communications between the first node 111 and other nodes or devices, e.g., the second node 112, the fourth node 114, the sixth node 116, a wireless device, the host computer 1310, or any of the other nodes. In some particular examples, the interface may, for example, include a transceiver configured to transmit and receive radio signals over an air interface in accordance with a suitable standard.

Figure 13:
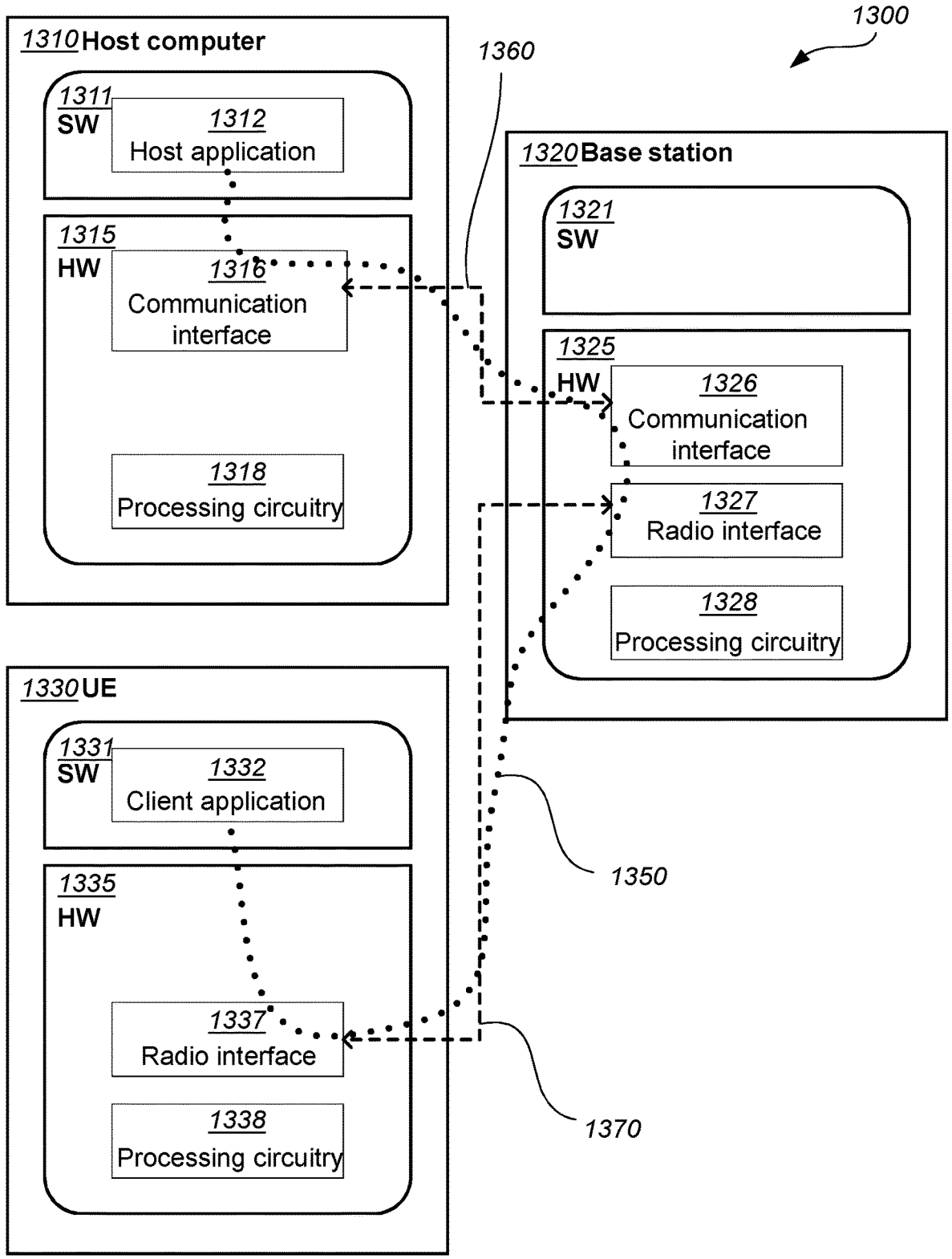
FIG. 13 is a generalized block diagram of a host computer communicating via a base station with a user equipment over a partially wireless connection, according to embodiments herein.

The first node 111 may comprise an arrangement as shown in FIG. 8 or in FIG. 13.

The fourth node 114 embodiments relate to FIG. 11, FIG. 9 and FIGS. 12-17.

A method, performed by a fourth node such as the fourth node 114, is described herein. The method may be understood to be for handling access of the first node 111 to the communications network 100. The access of the first node 111 to the communications network 100 may be in a multi-hop deployment. The fourth node 114 may be operating in the communications network 100.

The method may comprise one or more of the following actions.

In some examples all the actions may be performed. One or more examples may be combined, where applicable. All possible combinations are not described to simplify the description. Some actions may be performed in a different order than that shown in FIG. 11.

Receiving 1101, e.g., in the indication from the first node 111, which may be the report, one or more of the following:
 an identity of nodes in a plurality of candidate parent nodes 120, in the first set 121, and/or in the second set 122, within radio range of the first node 111, e.g., having a respective measurement of a respective link between the first node 111 and each respective candidate parent node in the plurality of candidate parent nodes 120 exceeding a threshold,
 a respective measurement of a quality of a respective link between the first node 111 and each of the nodes in the plurality of candidate parent nodes 120, in the first set 121, and/or in the second set 122,
 respective information from a plurality of other fourth nodes 116 operating in the communications network 100, the respective information indicating a respective recommendation on which node out of the plurality of candidate parent nodes 120, out of the first set 121, and/or out of the second set 122 to connect to,
 a respective indication, from the plurality of the other fourth nodes 116, the respective indication indicating a respective suitability of the respective recommendation, or
 additional information about the nodes in: the plurality of candidate parent nodes 120, the first set 121, and/or the second set 122, The fourth node 114 may be configured to perform this receiving action 1101, e.g., by means of a receiving unit 901 within the fourth node 114, configured to perform this action. The receiving unit 901 may be the processor 905 of the fourth node 114, or an application running on such processor.

Determining 1102, or selecting, a second node 112, or parent node, for the first node 111 to establish a connection with. The fourth node 114 may be configured to perform this determining action 1102, e.g., by means of a determining unit 902 within the fourth node 114, configured to perform this action. The determining unit 1102 may be the processor 905 of the fourth node 114, or an application running on such processor.

The determining, or selecting, in this Action 1102 may be out of the plurality of candidate parent nodes 120, out of the first set 121, and/or out of the second set 122.

The determining in this Action 1102, may be based on at least one of:
 a first estimation of a respective end-to-end performance between the first node 111 and a third node 113, also known as donor node or end node, wherein the first node 111 is enabled to access a backhaul connection of the third node 113 to the communications network 100 via, respectively, each candidate parent node in the plurality of candidate parent nodes 120,
 a second estimation of a respective end-to-end performance between the first node 111 and a third node 113, also known as donor node or end node, wherein the first node 111 is enabled to access a backhaul connection of the third node 113 to the communications network 100 via, respectively, each candidate parent node in a first set 121 of the plurality of candidate parent nodes 120,
 a third estimation of a respective end-to-end performance between the first node 111 and a sixth node 116, also known as other donor node or other end node, wherein the first node 111 is enabled to access a backhaul connection of the sixth node 116 to the communications network 100 via, respectively, each candidate parent node in a second set 122 of the plurality of candidate parent nodes 120,
 a fourth estimation of a respective impact of a respective connection to each of the candidate parent nodes in the plurality, on, e.g., a traffic load of, one or more upstream serving, or parent, nodes 115,
 the received indication,
 the identity of nodes in the plurality of candidate parent nodes 120, in the first set 121, and/or in the second set 122, within radio range of the first node 111 having the respective measurement of the respective link between the first node 111 and each respective candidate parent node in the plurality of candidate parent nodes 120 exceeding the threshold,
 the respective measurement of the quality of the respective link between the first node 111 and each of the nodes in the plurality of candidate parent nodes 120, in the first set 121, and/or in the second set 122,
 the respective information from the plurality of other fourth nodes 116 operating in the communications network 100, the respective information indicating the respective recommendation on which node out of the plurality of candidate parent nodes 120, out of the first set 121, and/or out of the second set 122 to connect to, the respective indication, from the plurality of the other fourth nodes 116, the respective indication indicating the respective suitability of the respective recommendation, or the additional information about the plurality of candidate parent nodes 120, the first set 121, and/or the second set 122.

Indicating 1103 the determined second node 112. The fourth node 114 may be configured to perform this indicating 1103 action, e.g. by means of an indicating unit 903 within the fourth node 114, configured to perform this action. The indicating unit 903 may be a processor 905 of the fourth node 114, or an application running on such processor.

The indicating in this Action 1103, may be to the first node 111, e.g., via the fourth link 144.

The indicating in this Action 1103 may be performed by providing e.g., an index.

In some examples, the indicating 1103 may further comprise an indication of a suitability of the determination, e.g., a "measure of goodness".

In some examples, the indicating 1103 may further comprise indicating a list of identities of considered candidate parent nodes.

Other units 809 may be comprised in the fourth node 114.

Any of the obtaining actions performed by fourth node 114 the may understood to be equally enabled to be performed by, e.g., by the sixth node 116.

The fourth node 114 may also be configured to communicate user data with a host application unit in a host computer 1310, e.g., via another link such as 1350.

In FIG. 9, optional units are indicated with dashed boxes.

The fourth node 114 may comprise an interface unit to facilitate communications between the fourth node 114 and other nodes or devices, e.g., the first node 111, the second node 112, the host computer 1310, or any of the other nodes. In some particular examples, the interface may, for example, include a transceiver configured to transmit and receive radio signals over an air interface in accordance with a suitable standard.

The fourth node 114 may comprise an arrangement as shown in FIG. 9 or in FIG. 13.

Further Extensions and Variations

Figure 12:
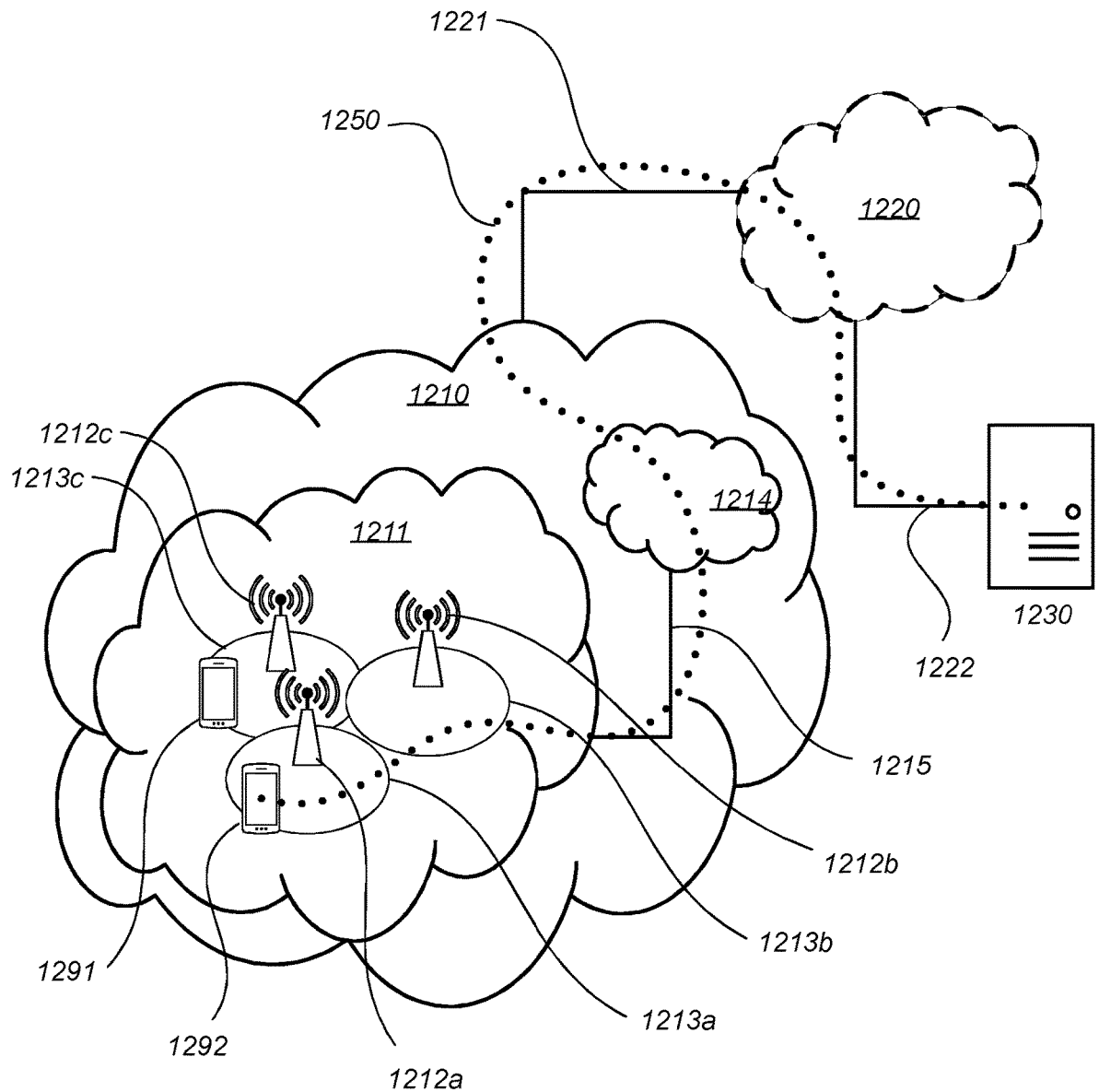
FIG. 12 is a schematic block diagram illustrating a telecommunication network connected via an intermediate network to a host computer, according to embodiments herein.

FIG. 12: Telecommunication Network Connected Via an Intermediate Network to a Host Computer in Accordance with Some Embodiments With reference to FIG. 12, in accordance with an embodiment, a communication system includes telecommunication network 1210 such as the communications network 100, for example, a 3GPP-type cellular network, which comprises access network 1211, such as a radio access network, and core network 1214. Access network 1211 comprises a plurality of network nodes such as any of the first node 111, and/or the fourth node 114. For example, base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. In FIG. 12, a first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212. Any of the UEs 1291, 1292 may be considered to, under certain circumstances, to act as examples of the first node 111, e.g., of its MT function.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

In relation to FIGS. 13, 14, 15, 16, and 17, which are described next, it may be understood that a UE is an example of the first node 111, and that any description provided for the UE equally applies to the first node 111. It may be also understood that the base station is an example of any of the first node 111, and/or the fourth node 114, and that any description provided for the base station equally applies to any of the first node 111, and/or the fourth node 114.

FIG. 13: Host Computer Communicating Via a Base Station with a User Equipment Over a Partially Wireless Connection in Accordance with Some Embodiments Example implementations, in accordance with an embodiment, of the UE, as an example of the first node 111, any of the first node 111, and/or the fourth node 114, e.g., a base station and host computer discussed in the preceding paragraphs will now be described with reference to FIG. 13. In communication system 1300, such as the communications network 100, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes any of the first node 111, and/or the fourth node 114, exemplified in FIG. 13 as a base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with the first node 111, exemplified in FIG. 13 as a UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

The first node 111 embodiments relate to FIG. 3, FIG. 8 and FIGS. 12-17.

The first node 111 may also be configured to communicate user data with a host application unit in a host computer 1310, e.g., via another link such as 1350.

In FIG. 8, optional units are indicated with dashed boxes.

The first node 111 may comprise an interface unit to facilitate communications between the first node 111 and other nodes or devices, e.g., the second node 112, the fourth node 114, the sixth node 116, a wireless device, the host computer 1310, or any of the other nodes. In some particular examples, the interface may, for example, include a transceiver configured to transmit and receive radio signals over an air interface in accordance with a suitable standard.

The first node 111 may comprise an arrangement as shown in FIG. 8 or in FIG. 13.

The fourth node 114 embodiments relate to FIG. 4, FIG. 9 and FIGS. 12-17.

The fourth node 114 may also be configured to communicate user data with a host application unit in a host computer 1310, e.g., via another link such as 1350.

In FIG. 9, optional units are indicated with dashed boxes.

The fourth node 114 may comprise an interface unit to facilitate communications between the fourth node 114 and other nodes or devices, e.g., the first node 111, the second node 112, the host computer 1310, or any of the other nodes. In some particular examples, the interface may, for example, include a transceiver configured to transmit and receive radio signals over an air interface in accordance with a suitable standard.

The fourth node 114 may comprise an arrangement as shown in FIG. 9 or in FIG. 13.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by any of the first node 111, and/or the fourth node 114.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by any of the first node 111, and/or the fourth node 114.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by any of the first node 111, and/or the fourth node 114.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by any of the first node 111, and/or the fourth node 114.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions described herein as performed by the first node 111.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the first node 111.

26. The communication system of embodiment 25, further including the UE.

27. The communication system of embodiment 26, wherein the cellular network further includes a base station configured to communicate with the UE.

28. The communication system of embodiment 26 or 27, wherein:
   the processing circuitry of the host computer is configured to execute a host application, thereby providing the user data; and
   the UE's processing circuitry is configured to execute a client application associated with the host application.

31. A method implemented in a user equipment (UE), comprising one or more of the actions described herein as performed by the first node 111.

35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by the first node 111.

36. The method of embodiment 35, further comprising:
   at the UE, receiving the user data from the base station.

41. A user equipment (UE) configured to communicate with a base station, the UE comprising a radio interface and processing circuitry configured to perform one or more of the actions described herein as performed by the first node 111.

45. A communication system including a host computer comprising:
   a communication interface configured to receive user data originating from a transmission from a user equipment (UE) to a base station,
   wherein the UE comprises a radio interface and processing circuitry, the UE's processing circuitry configured to: perform one or more of the actions described herein as performed by the first node 111.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
   the processing circuitry of the host computer is configured to execute a host application; and
   the UE's processing circuitry is configured to execute a client application associated with the host application, thereby providing the user data.

49. The communication system of embodiment 46 or 47, wherein:

the processing circuitry of the host computer is configured to execute a host application, thereby providing request data; and the UE's processing circuitry is configured to execute a client application associated with the host application, thereby providing the user data in response to the request data.

51. A method implemented in a user equipment (UE), comprising one or more of the actions described herein as performed by the first node 111.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the first node 111.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by any of the first node 111, and/or the fourth node 114.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by any of the first node 111, and/or the fourth node 114.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by any of the first node 111, and/or the fourth node 114.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the first node 111.

76. The method of embodiment 75, further comprising:
at the base station, receiving the user data from the UE.

77. The method of embodiment 76, further comprising:
at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
IAB Integrated access and backhaul
MT Mobile termination
UE User equipment
RSRP Reference signal received power
SS Synchronization signal
PSS Primary synchronization signal
SSS Secondary synchronization signal
SSB SS/PBCH block
PBCH Physical broadcast channel
PCID Physical cell ID
CU Central Unit

REFERENCES

1. R2-1811998, 3GPP contribution, Samsung, "IAB Topology and Route Management" (see Observation 2, Proposal 1)
2. R3-184805, 3GPP contribution, Huawei, "Basic principles for IAB topology adaptation" (see section "Discussion" up to/including Proposal 2)
3. R1-1809232, 3GPP contribution, Ericsson, "More details on IAB evaluation methodology" (section 2.1.1)

The invention claimed is:

1. A method, performed by a first node, the method being for handling access of the first node to a communications network in a multi-hop deployment, the method comprising:
receiving, from a fourth node, information indicating a recommendation on which node within a radio range to connect to, out of a plurality of candidate parent nodes, wherein
the plurality of candidate parent nodes comprising a first set of candidate parent nodes and a second set of candidate parent nodes,
a third node is enabled to be a donor node to the first node in the first set,
a sixth node is enabled to be a donor node to the first node in the second set, and
the third node is in communication with a fifth node;
determining, out of the plurality of candidate parent nodes, a second node to establish a connection with, wherein the determining is based on the received information and at least one of:

a first estimation of a respective end-to-end performance between the first node and the third node via a first candidate parent node, a second estimation of a respective end-to-end performance between the first node and the third node via another candidate parent node, a third estimation of a respective end-to-end performance between the first node and the sixth node, and a fourth estimation of a respective impact of a respective connection to each of the plurality of candidate parent nodes, on a traffic load of one or more upstream parent node; and initiating establishment of a connection or re-connection to the communications network via the determined second node, as a first-hop node.

2. The method according to claim 1, further comprises:

obtaining a respective measurement of a quality of a respective link between the first node and each of the nodes in the plurality of candidate parent nodes, in the first set, and/or in the second set;

identifying the nodes in the plurality of candidate parent nodes, based on the respective measurement of the respective link between the first node and each respective candidate parent node in the plurality of candidate parent nodes exceeding a threshold;

connecting, temporarily, to one or more of the nodes in the plurality of candidate parent nodes, and providing an indication, to the fourth node, the indication indicating one or more of:
an identity of the nodes in the plurality of candidate parent nodes, in the first set, and/or in the second set, the respective measurement, and
additional information about the plurality of candidate parent nodes, the first set, and/or the second set, wherein the receiving from the fourth node is based on the provided indication.

3. The method according to claim 1, wherein the receiving further comprises receiving the information, respectively, from a plurality of fourth nodes comprising the fourth node as respective information, wherein the respective information indicates a respective recommendation on which node out of the plurality candidate of parent nodes, out of the first set, and/or out of the second set to connect to, and wherein the determining is further based on the received respective information.

4. The method according to claim 2, wherein the providing further comprises indicating the received respective information from the other fourth nodes in the plurality of fourth nodes.

5. The method according to claim 2, wherein:

the connecting comprises connecting, temporarily, to some or all of the candidate parent nodes, iteratively, in each set, wherein each set has a respective fourth node, and the indication further indicates, to each of the respective fourth nodes, one or more of:
the identity of the nodes in the respective set of the plurality of candidate parent nodes, the first set and the second set,
the respective measurement, and
additional information about the plurality of candidate parent nodes, the first set, and/or the second set.

6. The method according to claim 2, wherein the respective information further comprises at least one of:

a respective list of identities of considered candidate parent nodes;

respective additional information based on the provided additional information about the plurality of candidate parent nodes, the first set, and/or the second set; and a respective indication indicating a respective suitability of the respective recommendation.

7. The method according to claim 6, wherein the method further comprises:

updating a list of candidate parent nodes to consider, based on the list of identities and/or the respective list of identities.

8. The method according to claim 1, wherein the information further comprises at least one of:

list of identities of considered candidate parent nodes;

respective additional information based on the provided additional information about the plurality of candidate parent nodes, the first set, and/or the second set; and an indication of a suitability of the recommendation.

9. A method, performed by a fourth node, for handling access of a first node to a communications network in a multi-hop deployment, the fourth node operating in the communications network, the method comprising:

determining, for the first node, which node within radio range of the first node to connect to, out of a plurality of candidate parent nodes, wherein
the plurality of candidate parent nodes comprising a first set of candidate parent nodes and/or a second set of candidate parent nodes,
a third node is enabled to be a donor node to the first node in the first set,
a sixth node is enabled to be a donor node to the first node in the second set, and
the third node is in communication with a fifth node; and indicating, to the first node, information indicating a recommendation on which determined node within a radio range to connect to, wherein the determined node includes a second node, and wherein the determination is based on at least one of:
a first estimation of a respective end-to-end performance between the first node and the third node, wherein the third node is enabled to be the donor node to the first node,
a second estimation of a respective end-to-end performance between the first node and the third node, wherein the third node is enabled to be the donor node to the first node in the first set,
a third estimation of a respective end-to-end performance between the first node and the sixth node, wherein the sixth node is enabled to be the donor node to the first node in the second set of the plurality of candidate parent nodes, and
a fourth estimation of a respective impact of a respective connection to each of the candidate parent nodes in the plurality, on a traffic load of one or more upstream parent nodes.

10. The method according to claim 9, further comprising:

receiving an indication from the first node, the indication indicating one or more of:

an identity of the nodes in the plurality of candidate parent nodes, in the first set, and/or in the second set, within radio range of the first node having a respective measurement of a respective link between the first node and each respective candidate parent node in the plurality of candidate parent nodes exceeding a threshold;

a respective measurement of a quality of a respective link between the first node and each of the nodes in the plurality of candidate parent nodes, in the first set, and/or in the second set;

respective information from a plurality of other fourth nodes operating in the communications network, the respective information indicating a respective recommendation on which node out of the plurality of candidate parent nodes, out of the first set, and/or out of the second set to connect to;

a respective indication, from the plurality of the other fourth nodes, the respective indication indicating a respective suitability of the respective recommendation;

additional information about the plurality of candidate parent nodes, the first set, and/or the second set; and one or more of:
an identity of the nodes in a respective set of the plurality of candidate parent nodes, the first set, and the second set,
a respective measurement, and
additional information about the respective set of the plurality of candidate parent nodes, the first set, and the second set, and
wherein the determining is based on the received indication.

11. The method according to claim 9, wherein the determining is further based on at least one of:
an identity of nodes in the plurality of candidate parent nodes, in the first set, and/or in the second set, within radio range of the first node having a respective measurement of a respective link between the first node and each respective candidate parent node in the plurality of candidate parent nodes exceeding the threshold;
a respective measurement of a quality of the respective link between the first node and each of the nodes in the plurality of candidate parent nodes, in the first set, and/or in the second set;
respective information from a plurality of other fourth nodes operating in the communications network, the respective information indicating the respective recommendation on which node out of the plurality of candidate parent nodes, out of the first set, and/or out of the second set to connect to;
a respective indication, from the plurality of the other fourth nodes, the respective indication indicating a respective suitability of the respective recommendation; and
additional information about the plurality of candidate parent nodes, the first set, and/or the second set.

12. The method according to claim 9, wherein the information further comprises at least one of:
a list of identities of considered candidate parent nodes;
respective additional information based on the provided additional information about the plurality of candidate parent nodes, the first set, and/or the second set; and
an indication of a suitability of the determination.

13. A first node, for handling access of the first node to a communications network in a multi-hop deployment, the first node comprising:
a processor configured to:
receive, from a fourth node, information configured to indicate a recommendation on which node within radio range to connect to, out of a plurality of candidate parent nodes, wherein the plurality of candidate parent nodes being configured to comprise a first set of candidate parent nodes and a second set of candidate parent nodes,
a third node is configured to be enabled to be a donor node to the first node in the first set,
a sixth node is configured to be enabled to be a donor node to the first node in the second set, and
the third node is in communication with a fifth node;
determine, out of the plurality of candidate parent nodes, a second node to establish a connection with, wherein to determine is configured to be based on the received information and at least one of:
a first estimation of a respective end-to-end performance between the first node and the third node via a first candidate parent node,
a second estimation of a respective end-to-end performance between the first node and the third node via another candidate parent node,
a third estimation of a respective end-to-end performance between the first node and the sixth node, and
a fourth estimation of a respective impact of a respective connection to each of the candidate parent nodes in the plurality, on a traffic load of one or more upstream parent nodes; and
initiate establishment of a connection or re-connection to the communications network via the determined second node, as a first-hop node.

14. The first node according to claim 13, wherein the processor is further configured to:
obtain a respective measurement of a quality of a respective link between the first node and each of the nodes in the plurality of candidate parent nodes, in the first set, and/or in the second set;
identify the nodes in the plurality of candidate parent nodes, based on the respective measurement of the respective link between the first node and each respective candidate parent node in the plurality of candidate parent nodes exceeding a threshold;
connect, temporarily, to one or some of the nodes in the plurality of candidate parent nodes; and
provide an indication, to the fourth node, the indication being configured to indicate one or more of:
an identity of the nodes in the plurality of candidate parent nodes, in the first set, and/or in the second set,
the respective measurement, and
additional information about the plurality of candidate parent nodes, the first set, and/or the second set, wherein to receive from the fourth node is configured to be based on the provided indication.

15. The first node according to claim 14, wherein to provide is further configured to comprise indicating the received respective information from the other fourth nodes in the plurality of fourth nodes.

16. The first node according to claim 14, wherein:
to connect is configured to comprise connecting, temporarily, to some or all of the candidate parent nodes, iteratively, in each set, wherein each set is configured to have a respective fourth node, and
the indication is further configured to indicate, to each of the respective fourth nodes, one or more of:
the identity of the nodes in the respective set of the plurality of candidate parent nodes, the first set and the second set,
the respective measurement, and
additional information about the plurality of candidate parent nodes, the first set, and/or the second set.

17. The first node according to claim 13, wherein to receive is further configured to comprise receiving the information, respectively, from a plurality of fourth nodes comprising the fourth node as respective information, wherein the respective information is configured to indicate a respective recommendation on which node out of the plurality candidate of parent nodes, out of the first set, and/or out of the second set to connect to, and wherein to determine is further configured to be based on the received respective information.

18. A fourth node, for handling access of a first node to a communications network in a multi-hop deployment, the fourth node being configured to operate in the communications network, the fourth node comprising to:
a processor configured to:
  determine, for the first node, which node within radio range of the first node to connect to, out of a plurality of candidate parent nodes, wherein
    the plurality of candidate parent nodes configured to comprise a first set of candidate parent nodes and/or a second set of candidate parent nodes,
    a third node is configured to be enabled to be a donor node to the first node in the first set,
    a sixth node is configured to be enabled to be a donor node to the first node in the second set, and
    the third node is in communication with a fifth node; and
  indicate, to the first node, information configured to indicate a recommendation on which determined node within radio range to connect to, wherein the determined node includes a second node, and wherein the determination is based on at least one of:
    a first estimation of a respective end-to-end performance between the first node and the third node, wherein the third node is enabled to be the donor node to the first node,
    a second estimation of a respective end-to-end performance between the first node and the third node, wherein the third node is enabled to be the donor node to the first node in the first set,
    a third estimation of a respective end-to-end performance between the first node and the sixth node, wherein the sixth node is enabled to be the donor node to the first node in the second set of the plurality of candidate parent nodes, and
    a fourth estimation of a respective impact of a respective connection to each of the candidate parent nodes in the plurality, on a traffic load of one or more upstream parent nodes.

19. The fourth node according to claim 18, wherein the processor is further configured to:
receive an indication from the first node, the indication being configured to indicate one or more of:
an identity of the nodes in the plurality of candidate parent nodes, in the first set, and/or in the second set, within radio range of the first node having a respective measurement of a respective link between the first node and each respective candidate parent node in the plurality of candidate parent nodes exceeding a threshold;
a respective measurement of a quality of a respective link between the first node and each of the nodes in the plurality of candidate parent nodes, in the first set, and/or in the second set;
respective information from a plurality of other fourth nodes configured to operate in the communications network, the respective information being configured to indicate a respective recommendation on which node out of the plurality of candidate parent nodes, out of the first set, and/or out of the second set to connect to;
a respective indication, from the plurality of the other fourth nodes, the respective indication being configured to indicate a respective suitability of the respective recommendation;
additional information about the plurality of candidate parent nodes, the first set, and/or the second set; and
one or more of:
an identity of the nodes in a respective set of the plurality of candidate parent nodes, the first set and the second set,
a respective measurement, and
additional information about the respective set of the plurality of candidate parent nodes, the first set and the second set, and wherein to determine is configured to be based on the indication configured to be received.

* * * * *